US012512063B2

(12) United States Patent
Choi et al.

(10) Patent No.: US 12,512,063 B2
(45) Date of Patent: Dec. 30, 2025

(54) STAIN COMPENSATING SYSTEM AND STAIN COMPENSATING METHOD

(71) Applicant: SAMSUNG DISPLAY CO., LTD., Yongin-si (KR)

(72) Inventors: Hakmo Choi, Yongin-si (KR); Seyun Kim, Yongin-si (KR); Hyungwoo Yim, Yongin-si (KR); Huisu Kim, Yongin-si (KR); Seungho Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/766,735

(22) Filed: Jul. 9, 2024

(65) Prior Publication Data

US 2025/0054450 A1 Feb. 13, 2025

(30) Foreign Application Priority Data

Aug. 11, 2023 (KR) ........................ 10-2023-0105601

(51) Int. Cl.
*G09G 3/32* (2016.01)
*G09G 3/00* (2006.01)
*G09G 3/3258* (2016.01)

(52) U.S. Cl.
CPC ........... *G09G 3/3258* (2013.01); *G09G 3/006* (2013.01); *G09G 3/32* (2013.01); *G09G 2300/0842* (2013.01); *G09G 2320/0233* (2013.01); *G09G 2330/10* (2013.01)

(58) Field of Classification Search
CPC ........ G09G 3/3258; G09G 3/006; G09G 3/32; G09G 2300/0842; G09G 2320/0233; G09G 2330/10
See application file for complete search history.

(56) References Cited

U.S. PATENT DOCUMENTS 9,262,964 B2 2/2016 Nam et al.
11,545,110 B2 1/2023 Yang et al.
2013/0229550 A1* 9/2013 Nakao .................... H04N 25/68 348/246
2020/0127072 A1* 4/2020 Chen .................. H10K 59/8051
2021/0287626 A1* 9/2021 Liu .......................... G09G 3/36
2023/0206816 A1* 6/2023 Wu ...................... G09G 3/2074 345/204

(Continued)

*Primary Examiner* — Michael A Faragalla
(74) *Attorney, Agent, or Firm* — F. CHAU & ASSOCIATES, LLC

(57) ABSTRACT

A system for compensating a stain in a display device including a display panel including pixels and a driving controller, an imaging unit, and an inspection device including a defect characteristic classifying unit, and a compensation data generating unit. The inspection device generates first measurement data and second measurement data. The inspection device compares second image data with compensation data that is based on the first and second measurement data, and the defect characteristic classifying unit classifies, as a first defect pixel or a second defect pixel a plurality of pixels, based on the first measurement data, the second measurement data, and the second image data. The compensation data generating unit generates a first compensating value for compensating for the first defect pixel in a first pixel unit, and a second compensating value for compensating for the second defect pixel in a second pixel unit different from the first unit.

19 Claims, 18 Drawing Sheets

(56) References Cited

U.S. PATENT DOCUMENTS

| | | | | |
|---|---|---|---|---|
| 2023/0215307 | A1 * | 7/2023 | Hwang | G09G 3/006 345/204 |
| 2024/0169868 | A1 * | 5/2024 | Li | H10K 59/131 |

* cited by examiner

STAIN COMPENSATING SYSTEM AND STAIN COMPENSATING METHOD

CROSS-REFERENCE TO RELATED APPLICATIONS

This application claims priority under 35 U.S.C. § 119 to Korean Patent Application No. 10-2023-0105601, filed on Aug. 11, 2023, in the Korean Intellectual Property Office, the disclosure of which is incorporated by reference in its entirety herein.

1. TECHNICAL FIELD

Embodiments of the present disclosure described herein relate to a system (hereinafter, referred to as a "stain compensating system") for compensating a stain and a method (hereinafter, referred to as a "stain compensating method") for compensating a stain having increased reliability.

2. DISCUSSION OF RELATED ART

In general, a display device includes a display panel that displays an image and a driving circuit that drives the display panel. The display panel includes a plurality of scan lines, a plurality of data lines and a plurality of pixels. The driving circuit includes a data driving circuit to output a data driving signal to the data lines, a scan driving circuit to output a scan signal to drive the scan lines, and a driving controller to control the data driving circuit and the scan driving circuit.

The display device may output a scan signal to a scan line connected to a pixel for displaying an image, and provide a data voltage corresponding to the image to a data line connected to the pixel, thereby displaying the image.

SUMMARY

Embodiments of the present disclosure provide a stain compensating system and a stain compensating method having increased reliability.

According to an embodiment of the present disclosure, a system for compensating a stain includes a display device having a display panel including a plurality of pixels displaying an image and a driving controller driving the display panel. An imaging unit captures the image displayed by the display device. An inspection device outputs a first compensating value and a second compensating value that is different from the first compensating value to the driving controller. The inspection device includes a defect characteristic classifying unit and a compensation data generating unit. The inspection device acquires a first measurement data and a second measurement data based on a first image data generated by the imaging unit. The inspection device compares second image data generated by the imaging unit with compensation data that is based on the first measurement data and the second measurement data to determine the first and second compensating values. The defect characteristic classifying unit classifies the plurality of pixels as a first defect pixel having a first defect or a second defect pixel having a second defect different from the first defect, based on the first measurement data, the second measurement data, and the second image data. The compensation data generating unit generates the first compensating value for compensating for the first defect pixel in a first pixel unit and the second compensating value for compensating for the second defect pixel in a second pixel unit different from the first pixel unit.

In an embodiment, the inspection device may further include an inspection storage unit storing the first measurement data and the second measurement data.

In an embodiment, the second pixel unit may be smaller than the first pixel unit.

In an embodiment, the first pixel unit may have a size equal to an area of 8×8 pixels, and the second pixel unit may have a size equal to an area of 1×1 pixels.

In an embodiment, the first compensating value may compensate for a brightness of the first defect pixel, and the second compensating value may compensate for a color of the second defect pixel.

In an embodiment, the first measurement data may be data generated by measuring the display panel in a state where the display panel is not connected to the driving controller, using a full contact array tester and the imaging unit.

In an embodiment, the second image data may include a (2-1)-th image data generated by capturing the display panel that displays only first light having a first color, and a (2-2)-th image data generated by capturing the display panel that displays only a second light having a second color different from the first color.

In an embodiment, each of the plurality of pixels may include a driving transistor and a light emitting element electrically connected to the driving transistor.

In an embodiment, the second measurement data may be data generated by linear driving of the driving transistor in the display panel in a state where the display panel is not connected to the driving controller.

In an embodiment, the inspection device may receive first compensation data, second compensation data, and third compensation data, after first compensating a defect characteristic predicted based on the first measurement data and the second measurement data from the display device, the first compensation data may be data generated by re-detecting the defect characteristic by measuring a threshold voltage of the driving transistor, the second compensation data may be data generated by re-detecting the defect characteristic by measuring mobility of the driving transistor, and the third compensation data may be data generated by re-detecting the defect characteristic by measuring a characteristic of the light emitting element.

In an embodiment, the compensation data generating unit may additionally generate a third compensating value for compensating for brightness of the first defect pixel in the second unit.

In an embodiment, the defect characteristic classifying unit may additionally classify a third defect pixel that is different from each of the first defect pixel and the second defect pixel, the compensation data generating unit additionally may generate a fourth compensating value for compensating for grayscale of the third defect pixel in the first unit.

In an embodiment, the compensation data generating unit additionally may generate a fifth compensating value for compensating for color of the second defect pixel in the first unit.

In an embodiment, the compensation data generating unit additionally may generate a sixth compensating value for compensating for grayscale of the third defect pixel in the second unit.

According to an embodiment of the present disclosure, a method for compensating for a stain, may include measuring first measurement data for a display panel including a plurality of pixels using a full contact array tester and an imaging unit, measuring second measurement data by linear driving the display panel, classifying the plurality of pixels as a first defect pixel having a first defect or a second defect pixel having a second defect different from the first defect, based on the first measurement data and the second measurement data, extracting image data by capturing an image displayed by a display device including the display panel and a driving controller, by the imaging unit, re-classifying the first defect pixel and the second defect pixel, based on the extracted image data, and generating a first compensating value for compensating for the first defect pixel in a first pixel unit and a second compensating value for compensating for the second defect pixel in a second pixel unit different from the first pixel unit.

In an embodiment, the extracting of the image data may include extracting first image data generated by capturing the display panel that displays only first light having a first color, and extracting second image data generated by capturing the display panel that displays only a second light having a second color different from the first color.

In an embodiment, each of the plurality of pixels may include a driving transistor and a light emitting element electrically connected to the driving transistor, and the method may further include receiving compensation data measured from the driving transistor and the light emitting element.

In an embodiment, the display panel further may include a light control pattern and a color filter disposed on the light emitting element, and the classifying into the first defect pixel or the second defect pixel may include classifying a defect made by the driving transistor and the light emitting element as the first defect, based on the first measurement data and the compensation data, and classifying a defect resulting from the light control pattern and the color filter as the second defect, based on the second measurement data and the image data.

In an embodiment, the re-classifying of the first defect pixel and the second defect pixel may include receiving first compensation data generated by re-detecting a defect characteristic by measuring a threshold voltage of the driving transistor, receiving second compensation data generated by re-detecting the defect characteristic by measuring mobility of the driving transistor, and receiving third compensation data generated by re-detecting the defect characteristic by measuring a characteristic of the light emitting element.

In an embodiment, the first pixel unit may have a size equal to an area of 8×8 pixels, and the second pixel unit may have a size equal to an area of 1×1 pixels.

BRIEF DESCRIPTION OF THE DRAWINGS

The above and other objects and features of the present disclosure will become apparent by describing in detail non-limiting embodiments thereof with reference to the accompanying drawings.

DETAILED DESCRIPTION OF EMBODIMENTS

Figure 1:
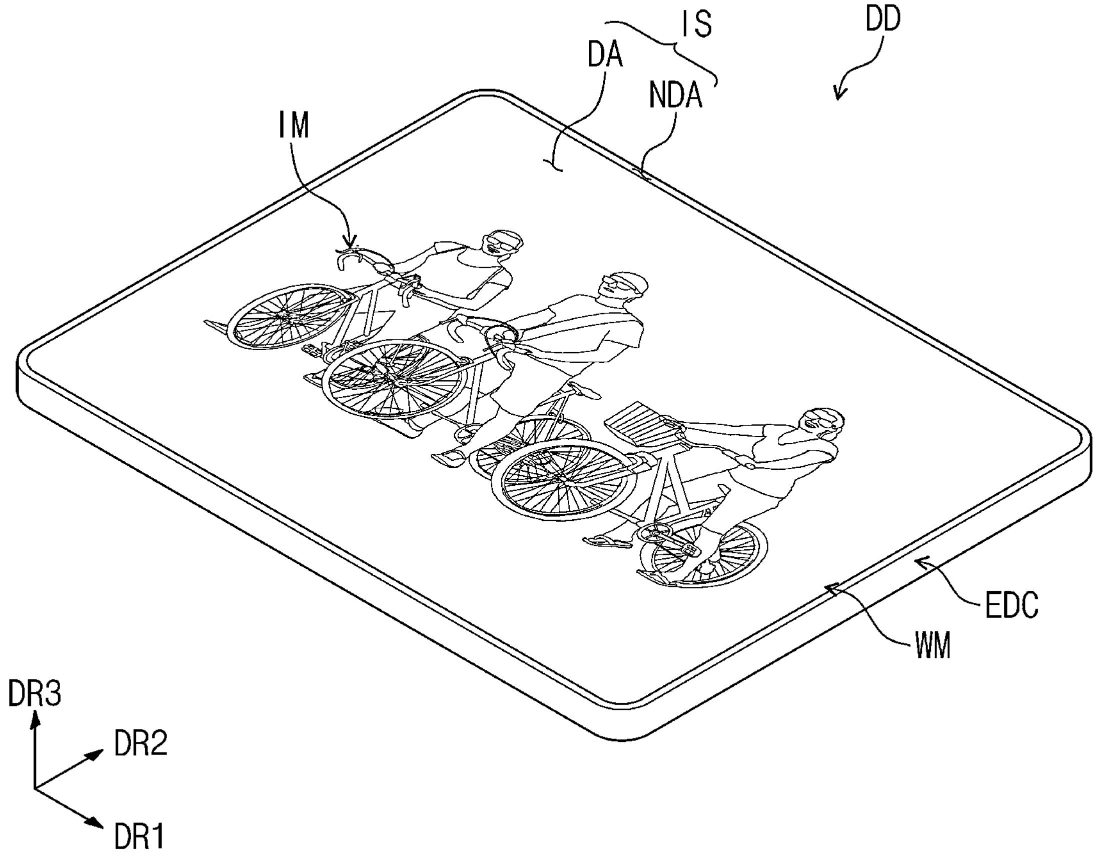
FIG. 1 is a perspective view of a display device according to an embodiment of the present disclosure.

In the specification, the expression that a first component (or region, layer, part, portion, etc.) is “on”, “connected to”, or “coupled to” a second component means that the first component is directly on, connected to, or coupled to the second component or means that a third component is interposed therebetween. The expression that a first component (or region, layer, part, portion, etc.) is “directly on”, “directly connected to”, or “directly coupled to” a second component means that no intervening components are interposed therebetween.

The same reference numeral will be assigned to the same component. In addition, in drawings, thicknesses, proportions, and dimensions of components may be exaggerated to describe the technical features effectively. The term “and/or” includes any and all combinations of one or more of associated components Although the terms “first”, “second”, etc. may be used to describe various components, the components should not be construed as being limited by the terms. The terms are only used to distinguish one component from another component. For example, without departing from the scope and spirit of embodiments of the present disclosure, a first component may be referred to as a second component, and similarly, the second component may be referred to as the first component. The singular forms are intended to include the plural forms unless the context clearly indicates otherwise.

In addition, the terms "under", "at a lower portion", "above", "an upper portion" are used to describe the relationship between components illustrated in drawings. The terms are relative and are described with reference to a direction indicated in the drawing.

It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
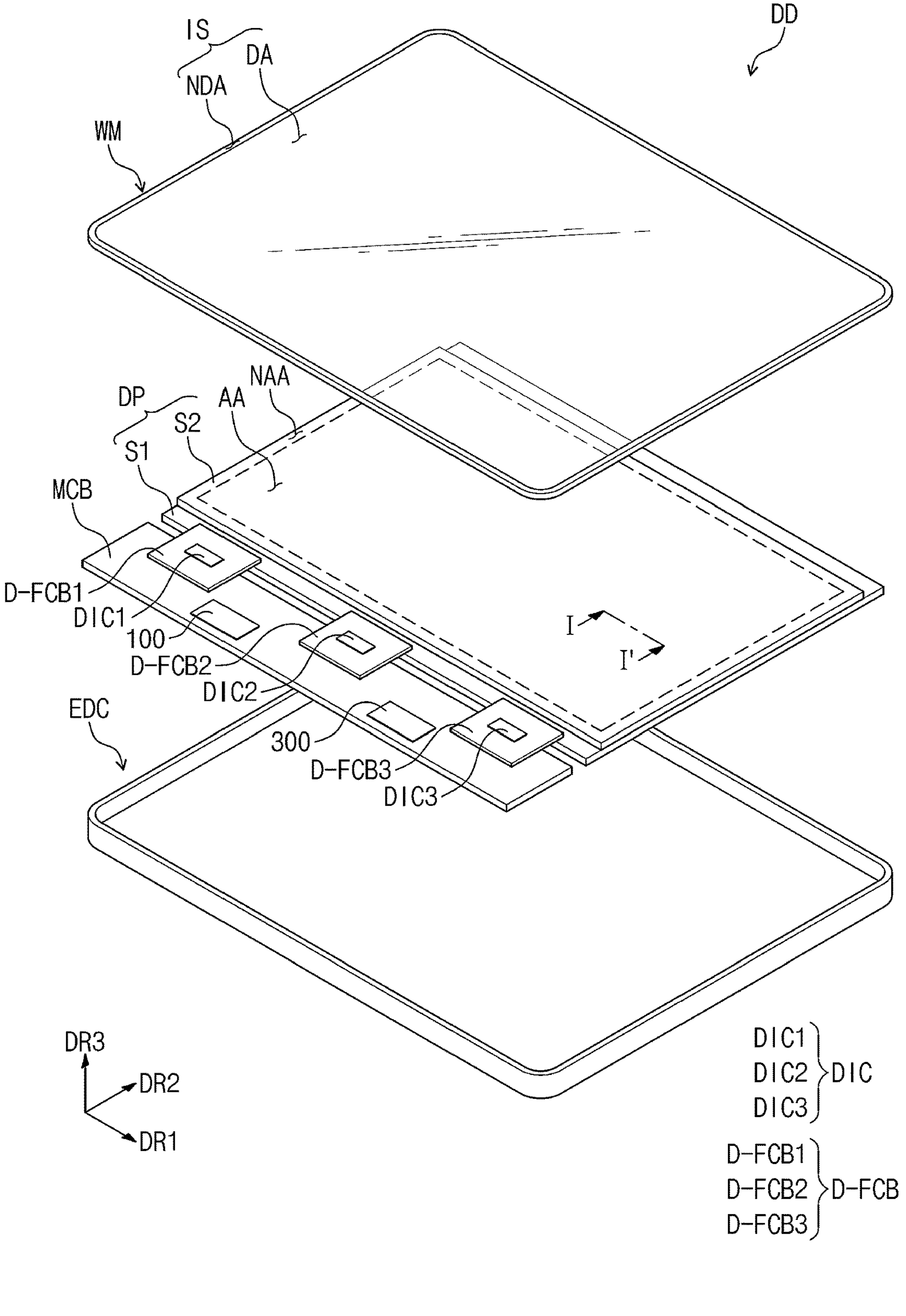
FIG. 2 is an exploded perspective view of a display device according to an embodiment of the present disclosure.

FIG. 1 is a perspective view of a display device according to an embodiment of the present disclosure, and FIG. 2 is an exploded perspective view of a display device according to an embodiment of the present disclosure.

Referring to FIGS. 1 and 2, a display device DD is a device activated in response to an electrical signal. According to the present disclosure, the display device DD may include a large-size display device, such as a television or a monitor, or a smaller-size or medium-size display device, such as a cellular phone, a tablet PC, a laptop computer, a vehicle navigation, or a game machine. However, embodiments of the present disclosure are not necessarily limited thereto and the display device DD may be applied to any other electronic device having a display device(s) applied thereto without departing from embodiments of the present disclosure. In an embodiment, the display device DD has a rectangular shape having a longer side in a first direction DR1, and a shorter side in a second direction DR2 crossing the first direction DR1. However, the shape of the display device DD is not necessarily limited thereto, but various display devices DD having various shapes may be provided. In an embodiment, the display device DD may display an image IM, in a third direction DR3, on a display surface IS defined in the first direction DR1 and the second direction DR2. The third direction DR3 may be a direction crossing the first direction DR1 and the second direction DR2. For example, in an embodiment, the first to third directions DR1, DR2, DR3 may be perpendicular to each other. However, embodiments of the present disclosure are not necessarily limited thereto. The display surface IS on which the image IM is displayed may correspond to a front surface of the display device DD.

According to an embodiment, a front surface (e.g., top surfaces) and a back surface (e.g., bottom surfaces) of members are defined based on a direction in which the image IM is displayed. The front surface and the back surface are opposite to each other in the third direction DR3, and a direction normal to the front surface and the back surface may parallel to the third direction DR3.

The distance between the front surface and the back surface in the third direction DR3 may correspond to the thickness of the display device DD in the third direction DR3. However, the first direction DR1, the second direction DR2, and the third direction DR3 may be relative concepts and may be changed to different directions.

The display device DD may sense an input (e.g., an external input) applied from the outside. The external input may include various types of inputs that are provided from the outside of the display device DD. According to an embodiment of the present disclosure, the display device DD may sense an external input by the user, which is applied from the outside. In an embodiment, the external input by the user may include any one of various external inputs, such as a part of a body of the user, light, heat, or pressure, or the combination thereof. In addition, the display device DD may sense the external input by the user, which is applied to the side surface or the back surface of the display device DD, depending on the structures of the display device DD, and embodiments of the present disclosure are not necessarily limited to any one embodiment. According to an embodiment of the present disclosure, the external input may include an input by an input device (e.g., a stylus pen, an active pen, a touch pen, an electronic pen, or an e-pen).

The display surface IS of the display device DD may be divided into a display region DA and a non-display region NDA. The display region DA may be a region to display the image IM. The user views the image IM through the display region DA. According to an embodiment shown in FIGS. 1 and 2, the display region DA is illustrated as a rectangular shape having rounded corners. However, the shape is provided for illustrative purposes and embodiments of the present disclosure are not necessarily limited thereto. For example, the display region DA may have various different shapes.

The non-display region NDA may be adjacent to the display region DA (e.g., in the first and/or second directions DR1, DR2). In an embodiment, the non-display region NDA may have a specific color. The non-display region NDA may surround the display region DA. Accordingly, a shape of the display region DA may be defined substantially by the non-display region NDA. However, the above shape of the display region DA is provided for illustrative purpose and embodiments of the present disclosure are not necessarily limited thereto. For example, the non-display region NDA may be disposed to be adjacent to only one side of the display region DA or may be omitted in some embodiments. The display device DD according to an embodiment of the present disclosure may include various embodiments, and the present disclosure is not necessarily limited to any embodiment.

In an embodiment, the display device DD may further include a display panel DP, a main circuit board MCB, flexible circuit films D-FCB, driving chips DIC, and a window WM.

According to an embodiment of the present disclosure, the display panel DP may be an emissive-display panel. For example, the display panel DP may be an organic light emitting display panel, an inorganic light emitting display panel, or a quantum dot light emitting display panel. The light emitting layer of the organic light emitting display layer may include an organic light emitting material. A light emitting layer of the inorganic light emitting display panel may include an inorganic light emitting material. A light emitting layer of the quantum dot light emitting display panel may include a quantum dot and a quantum rod. Hereinafter, the display panel DP according will be referred to as the organic light emitting display panel for convenience of explanation.

The display panel DP may output the image IM, and the output image IM may be displayed on the display surface IS.

The window WM may include a transparent material to output the image IM. For example, in an embodiment the window WM may include glass, sapphire, or plastic. Although the window WM is illustrated in a single layer, embodiments of the present disclosure are not necessarily limited thereto. For example, the window WM may include a plurality of layers.

According to an embodiment, the window WM may include a light blocking pattern to define the non-display region NDA. In an embodiment, the light blocking pattern may include an organic layer having a color which is formed in a coating scheme.

The window WM may be coupled to the display panel DP through an adhesive film. According to an embodiment of the present disclosure, the adhesive film may include an optically clear adhesive film (OCA). However, the adhesive film is not necessarily limited thereto, but may include a typical adhesive agent and adhesion agent. For example, the adhesive film may include an optically clear resin (OCR) or a pressure sensitive adhesive (PSA) film.

In an embodiment, an input sensing layer may be further disposed between the window WM and the display panel DP. The input sensing layer may sense the external input. The input sensing layer may be directly disposed on the display panel DP. However, embodiments of the present disclosure are not necessarily limited thereto. For example, in some embodiments the input sensing layer may be omitted.

The display panel DP may display the image IM in response to an electrical signal. The display panel DP may be defined with an active region AA and a non-active region NAA. The active region AA may be defined as a region through which the image IM provided from the display region DA is output.

The non-active region NAA may be adjacent to the active region AA (e.g., in the first and/or second directions DR1, DR2). For example, the non-active region NAA may surround the active region AA. However, the shape is provided for illustrative purposes and embodiments of the present disclosure are not necessarily limited thereto. For example, the non-active region NAA may have various shapes, and is not necessarily limited to any one embodiment. According to an embodiment, the active region AA of the display panel DP may correspond to at least a portion of the display region DA.

The main circuit board MCB may be connected to the flexible circuit films D-FCB and may be electrically connected to the display panel DP. The flexible circuit films D-FCB are connected to the display panel DP to electrically connect the display panel DP to the main circuit board MCB.

In an embodiment, the main circuit board MCB may include a driving controller 100 and a voltage generator 300. The driving controller 100 may include circuits to drive the display panel DP. The flexible circuit film D-FCB may include the driving chips DIC mounted thereon.

According to an embodiment of the present disclosure, the flexible circuit films D-FCB may include a first flexible circuit film D-FCB1, a second flexible circuit film D-FCB2, and a third flexible circuit film D-FCB3. The driving chips DIC may include a first driving chip DIC1, a second driving chip DIC2, and a third driving chip DIC3. However, embodiments of the present disclosure are not necessarily limited thereto and the numbers of the flexible circuit films D-FCB and the driving chips DIC may vary. In an embodiment, the first to third flexible circuit films D-FCB1, D-FCB2, and D-FCB3 are disposed to be spaced apart from each other in the first direction DR1, and connected to the display panel DP to electrically connect the display panel DP to the main circuit board MCB. The first driving chip DIC1 may be mounted on the first flexible circuit film D-FCB1. The second driving chip DIC2 may be mounted on the second flexible circuit film D-FCB2. The third driving chip DIC3 may be mounted on the third flexible circuit film D-FCB3. However, embodiments of the present disclosure are not necessarily limited thereto. For example, the display panel DP may be electrically connected to the main circuit board MCB through one flexible circuit film, and only one data driving chip may be mounted on one flexible circuit film. In addition, the display panel DP may be electrically connected to the main circuit board MCB through at least four flexible circuit films, and only one data driving circuit may be mounted on one flexible circuit film.

Although FIG. 2 illustrates that first to third driving chips DIC1 to DIC3 may be mounted on the first to third flexible circuit films D-FCB1, D-FCB2, and D-FCB3, respectively, embodiments of the present disclosure are not necessarily limited thereto. For example, in some embodiments the first to third driving chips DIC1 to DIC3 may be directly mounted on the display panel DP. In this embodiment, a portion of the display panel DP, in which the first to third driving chips DIC1 to DIC3 are mounted, may be bent and disposed on the back surface of the display panel DP. For example, the first to third driving chips DIC1 to DIC3 may be directly mounted on the main circuit board MCB.

In an embodiment, the display device DD may further include an external case EDC to receive the display panel DP. The external case EDC may be coupled to the window WM to define the outer appearance of the display device DD. The external case EDC may absorb an impact applied from the outside and may prevent a foreign substance/moisture from being infiltrated into the display panel DP to protect components received in the external case EDC. In an embodiment, the external case EDC may be provided in the form in which a plurality of receiving members are coupled to each other.

The display device DD according to an embodiment may further include an electronic module including various functional modules to operate the display panel DP, a power supply module (e.g., a battery) to supply power necessary for overall operations of the display device DD, a bracket coupled with the display panel DP and/or the external case EDC to partition an inner space of the display device DD, etc.

Figure 3:
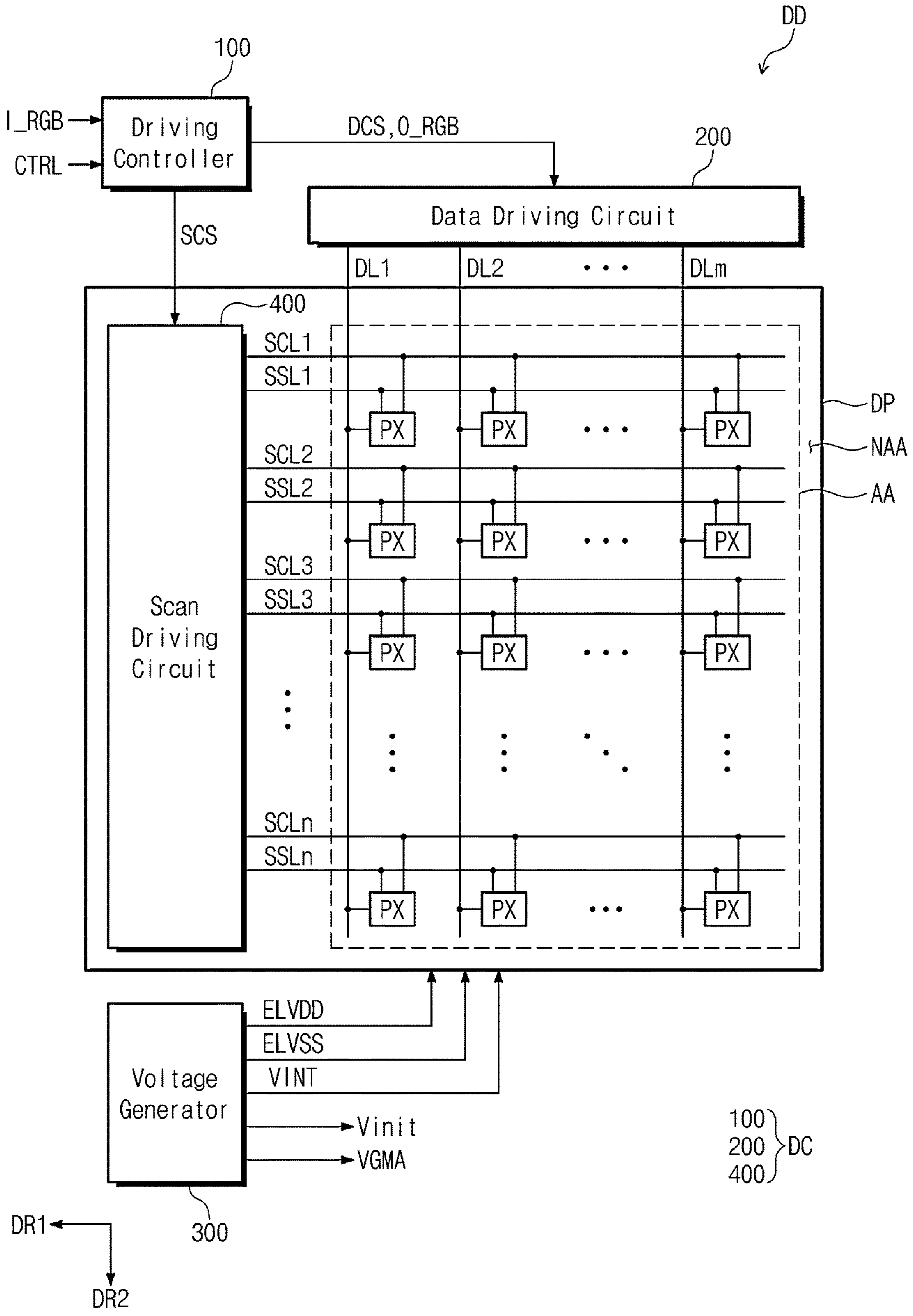
FIG. 3 is a block diagram of a display device according to an embodiment of the present disclosure.

FIG. 3 is a block diagram of a display device according to an embodiment of the present disclosure.

Referring to FIG. 3, in an embodiment the display device DD includes the display panel DP, the driving controller 100, a data driving circuit 200, a voltage generator 300, and a scan driving circuit 400. According to an embodiment, the driving controller 100, the data driving circuit 200, and the scan driving circuit 400 may be defined as a driving circuit DC.

In an embodiment, the driving controller 100 receives an input image data I_RGB and a control signal CTRL. The driving controller 100 may compensate for the input image data I_RGB suitably for the characteristic of the display panel DP and may output output image data O_RGB. In addition, the driving controller 100 may output a scan control signal SCS and a data control signal DCS.

The data driving circuit 200 may receive the data control signal DCS and the output image data O_RGB from the driving controller 100. The data driving circuit 200 converts the output image data O_RGB into data signals and then outputs the data signals to a plurality of data lines DL1 to DLm to be described later. The data signals are analog voltages corresponding to a grayscale value of the output image data O_RGB.

The display panel DP includes first scan lines SCL1 to SCLn in which n is an integer greater than or equal to 4, second scan lines SSL1 to SSLn, the data lines DL1 to DLm in which m is an integer greater than or equal to 3, and a plurality of pixels PX. The display panel DP may further include the scan driving circuit 400. According to an embodiment, the scan driving circuit 400 may be disposed at a first side of the display panel DP. The first scan lines SCL1 to SCLn and the second scan lines SSL1 to SSLn may extend in the first direction DR1 from the scan driving circuit 400.

The driving controller 100, the data driving circuit 200, and the scan driving circuit 400 are driving circuits to provide a data signal to the plurality of pixels PX of the display panel DP.

The display panel DP may be classified into the active region AA and the non-active region NAA. In an embodiment, the pixels PX may be disposed in the active region AA, and the scan driving circuit 400 may be disposed in the non-active region NAA.

In an embodiment, the first scan lines SCL1 to SCLn, and the second scan lines SSL1 to SSLN may be arranged to be spaced apart from each other in the second direction DR2. The data lines DL1 to DLm may extend in the second direction DR2 from the data driving circuit 200, and may be arranged to be spaced apart from each other in the first direction DR1.

The plurality of pixels PX may be electrically connected to the first scan lines SCL1 to SCLn, the second scan lines SSL1 to SSLn, and the data lines DL1 to DLm. For example, pixels in the first row may be connected to the first and second scan lines SCL1 and SSL1. In addition, the pixels in the second row may be connected to the first and second scan lines SCL2 and SSL2.

In an embodiment, each of the plurality of pixels PX includes a light emitting element ED (see FIG. 5) and a pixel circuit PXC (see FIG. 5) to control the light emitting element ED to emit light. The pixel circuit PXC (see FIG. 5) may include a plurality of transistors and a capacitor. In an embodiment, the scan driving circuit 400 may include transistors formed through the same process as that of the pixel circuit PXC (see FIG. 5).

Each of the pixels PX receives a first voltage ELVDD, a second voltage ELVSS, and an initialization voltage VINT.

The scan driving circuit 400 receives the scan control signal SCS from the driving controller 100. In addition, the scan driving circuit 400 may output first scan signals to the first scan lines SCL1 to SCLn and may output second scan signals to the second scan lines SSL1 to SSLn, in response to the scan control signal SCS.

According to an embodiment, the scan driving circuit 400 may be disposed at a first side of the active region AA (e.g., in the first direction DR1). However, embodiments of the present disclosure are not necessarily limited thereto. According to an embodiment, the scan driving circuit 400 may be disposed at the first side and the second side of the active region AA (e.g., in the first direction DR1). For example, the scan driving circuit 400 disposed at the first side of the active region AA may provide first scan signals to the first scan lines SCL1 to SCLn, and the scan driving circuit disposed at the second side of the active region AA may provide second scan signals to the second scan lines SSL1 to SSLn.

The voltage generator 300 generates voltages necessary for an operation of the display panel DP. According to an embodiment, the voltage generator 300 may generate the first voltage ELVDD, the second voltage ELVSS, and the initialization voltage VINT necessary for the operation of the display panel DP. The voltage generator 300 may further generate various voltages necessary for the operation of the display panel DP and the scan driving circuit 400, in addition to the first voltage ELVDD, the second voltage ELVSS, and the initialization voltage VINT. For example, in an embodiment the voltage generator 300 may additionally generate a first driving voltage Vinit and a second driving voltage VGMA necessary for the operations of the driving controller 100 and the data driving circuit 200.

Figure 4:
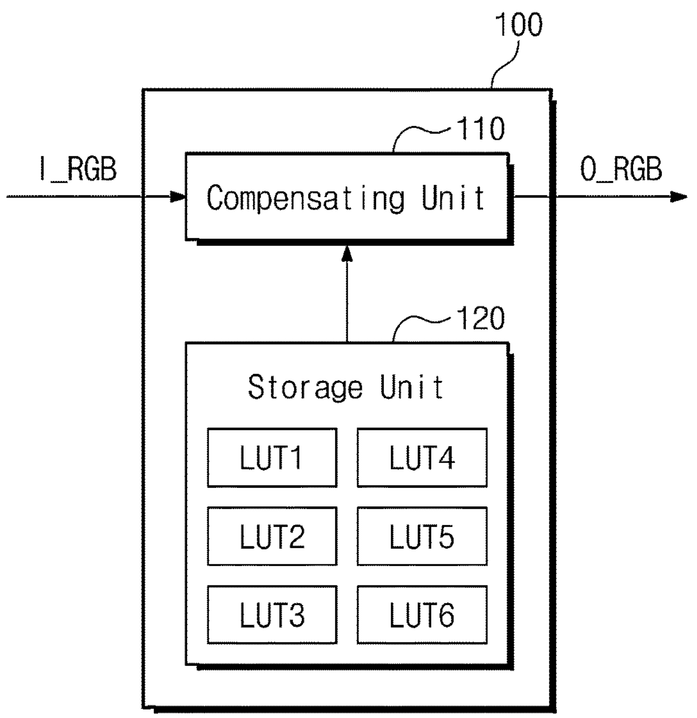
FIG. 4 is a block diagram illustrating a driving controller according to an embodiment of the present disclosure.

FIG. 4 is a block diagram illustrating a driving controller according to an embodiment of the present disclosure.

Referring to FIGS. 2 and 4, the driving controller 100 may include a compensating unit 110 and a storage unit 120.

In an embodiment, the storage unit 120 may include a first look-up table LUT1, a second look-up table LUT2, a third look-up table LUT3, a fourth look-up table LUT4, a fifth look-up table LUT5, and a sixth look-up table LUT6. However, embodiments of the present disclosure are not necessarily limited thereto and the number of the look-up tables in the storage unit 120 may vary.

In an embodiment, the compensating unit 110 may output the output image data O_RGB by compensating for the input image data I_RGB based on the first to sixth look-up tables LUT1 to LUT6.

In an embodiment, the first look-up table LUT1 may store a first compensating value for specifying the plurality of first defect pixels, which is classified as having the first defect, of the plurality of pixels PX and compensating for the brightness of the plurality of first defect pixels in a first unit of pixels (e.g., a pixel unit). The first compensating value may include a compensating voltage value provided to the first defect pixel.

In an embodiment, the first look-up table LUT1 may be a look-up table for compensating for a stain (e.g., a brightness difference stain) resulting from the brightness difference of the display panel DP. For example, a brightness difference stain and a fine brightness difference stain may be caused as a certain region of the display panel DP shows a brightness different from that of another region.

Figure 9:
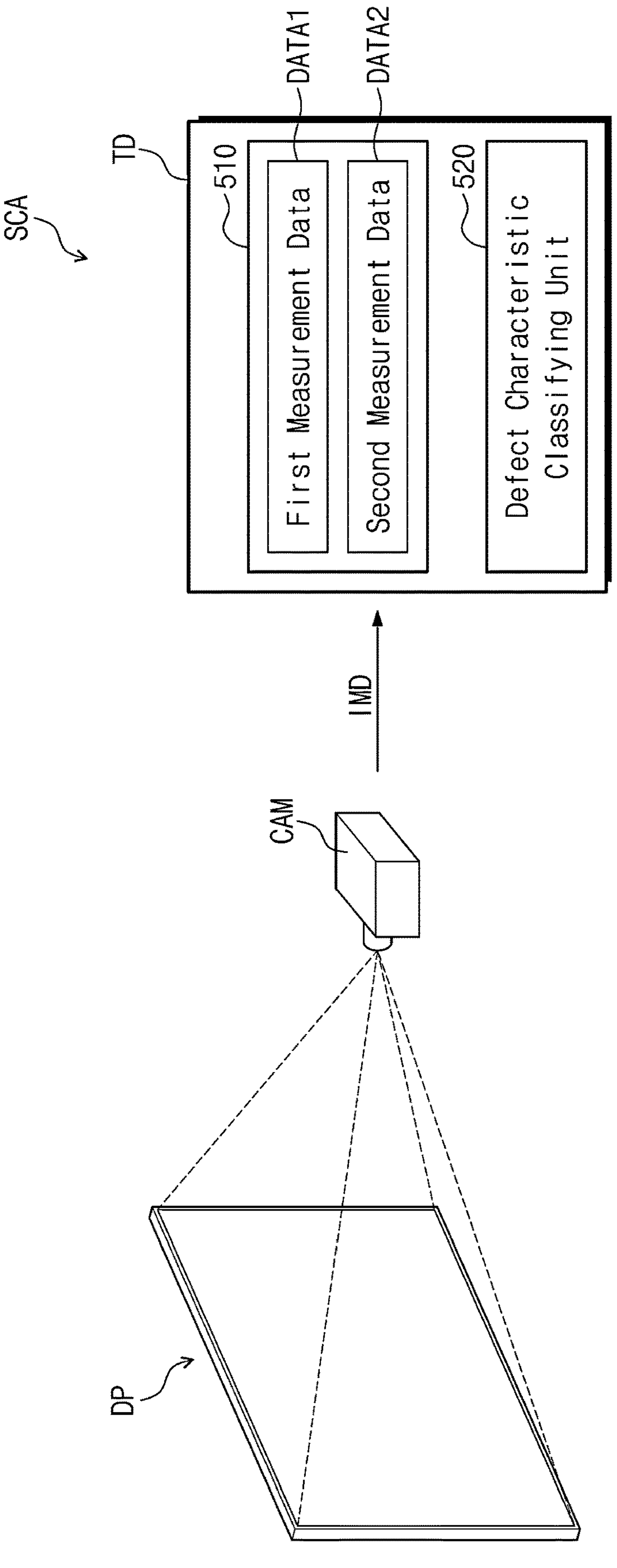
FIG. 9 illustrates a stain compensating system for performing a cell driving inspection step and a linear driving inspection step, according to an embodiment of the present disclosure.

The first defect may be a reference classified by an inspection device TD (see FIG. 9). The first look-up table LUT1 may store the first compensating value for the plurality of first defect pixels, which have the stain resulting from the brightness difference, of the plurality of pixels PX. The plurality of first defect pixels may include at least one of the plurality of pixels PX.

In an embodiment, the first defect may be a defect of a driving transistor TR1 (see FIG. 5) and/or a defect resulting from the light emitting element ED (see FIG. 5) with respect to each of the plurality of pixels PX.

In an embodiment, the size of the first unit of pixels may have the same area as 8×8 pixels. The compensating unit 110 may compensate for the plurality of pixels PX in first unit. The scheme of compensating for the plurality of pixels PX in the first unit may be referred to as a scheme of compensating for a representative value.

According to an embodiment of the present disclosure, the compensating unit 110 may compensate for only pixels having the brightness difference stain using the first compensating value. The compensating unit 110 may perform a brightness difference compensating operation for a local region of the display panel DP by using the first look-up table LUT1. The compensation performance for the display panel DP may be increased through the first look-up table LUT1 and the resources (e.g., calculation and storage) necessary for the compensation may be effectively utilized. Accordingly, the display device DD having increased reliability may be provided.

The second look-up table LUT2 may store a second compensating value for specifying a plurality of second defect pixels, which are classified as having the second defect, of the plurality of pixels PX and compensating for the brightness of the plurality of second defect pixels in a second unit.

Each of the plurality of second defect pixels may emit first light having the first color.

In an embodiment, the second look-up table LUT2 may be a look-up table for compensating for a fine monochrome stain of the display panel DP. For example, the monochrome stain and the fine monochrome stain may be defects resulting from the absorption of moisture into the optical control pattern and aeration into the optical control pattern. The monochrome stain and the fine monochrome stain may be the defects related to brightness uniformity, which are viewed only in a monochrome expressing the same color.

The second defect may be different from the first defect. The second defect may be a reference classified by the inspection device TD (see FIG. 9). The second look-up table LUT2 may store the second compensating value for the plurality of second defect pixels, which have the stain resulting from the fine monochrome stain, of the plurality of pixels PX. The plurality of second defect pixels may include at least one of the plurality of pixels PX.

The second defect may be a defect caused by a second substrate S2 including the light control pattern and the color filter.

In an embodiment, the second unit of pixels may be smaller than the first unit. For example, in an embodiment, the size of the second unit of pixels may have the same area as 1×1 pixels. For example, the second unit may have a same size as each of the plurality of pixels PX. The compensating unit 110 may compensate for the plurality of pixels PX in the second unit. For example, the size of the first unit may be 64 times greater than the size of the second unit.

According to an embodiment of the present disclosure, the compensating unit 110 may compensate for only pixels having the fine monochrome stain using the second compensating value. The compensating unit 110 may perform the fine monochrome stain compensating operation for the fine region of the display panel DP by using the second look-up table LUT2. The compensation performance for the display panel DP may be increased through the second look-up table LUT2 and the resources (e.g., calculation and storage) necessary for the compensation may be effectively utilized. Accordingly, the display device DD having increased reliability may be provided.

Unlike embodiments of the present disclosure, in a comparative embodiment in which the compensating operation is performed with respect to the entire portion of the plurality of pixels PX in smaller unit, a computation time may be increased, and a large memory space is required to store the compensating value. However, according to an embodiment of the present disclosure, some pixels of the plurality of pixels PX may be compensated using a plurality of look-up tables instead of compensating for the entire portion of the plurality of pixels PX. Accordingly, an embodiment of the present disclosure shows the same compensation performance, and requires reduced resources as compared to when the compensating operation is performed with respect to the entire portion of the plurality of pixels PX in a smaller unit. Accordingly, the display device DD having an increased reliability and quality (e.g., display quality) may be provided.

In an embodiment, the third look-up table LUT3 may store a third compensating value for compensating for the brightness of the plurality of first defect pixels of the plurality of pixels PX, in the second unit The third look-up table LUT3 may be a look-up table for compensating for a fine stain resulting from the brightness difference of the display panel DP.

According to an embodiment of the present disclosure, the compensating unit 110 may compensate for only pixels having the fine stain using the third compensating value. The compensating unit 110 may perform the brightness stain compensating operation for the fine region of the display panel DP by using the third look-up table LUT3. The compensation performance for the display panel DP may be increased through the third look-up table LUT3 and the resources (e.g., calculation and storage) necessary for the compensation may be effectively utilized. Accordingly, the display device DD having increased reliability may be provided.

In an embodiment, the fourth look-up table LUT4 may store a fourth compensating value for specifying the plurality of third defect pixels, which is classified as having the third defect, of the plurality of pixels PX and compensating for the grayscale value of the plurality of third defect pixels in the first unit In an embodiment, the fourth look-up table LUT4 may be a look-up table for compensating for a stain (e.g., a discoloration stain) resulting from the discoloration of the display panel DP. For example, the discoloration stain and the fine discoloration stain may be color uniformity defects as the gray pattern is viewed.

The third defect may be different from the first defect and the second defect. The third defect may be a reference classified by the inspection device TD (see FIG. 9). The fourth look-up table LUT4 may store a fourth compensating value for the plurality of third defect pixels, which are discolored, of the plurality of pixels PX. The plurality of third defect pixels may include at least one of the plurality of pixels PX.

The third defect may be caused by the second substrate S2 including a light control pattern and a color filter.

According to an embodiment of the present disclosure, the compensating unit 110 may compensate for only pixels discolored using the fourth compensating value. The compensating unit 110 may perform the brightness difference compensating operation for the local region of the display panel DP by using the fourth look-up table LUT4. The compensation performance for the display panel DP may be increased through the fourth look-up table LUT4 and the resources (e.g., calculation and storage) necessary for the compensation may be effective utilized. Accordingly, the display device DD having increased reliability may be provided.

In an embodiment, the fifth look-up table LUT5 may store a fifth compensating value for compensating for the brightness of the plurality of second defect pixels in the first unit.

The fifth look-up table LUT5 may be a look-up table for compensating for the monochrome stain of the display panel DP.

According to an embodiment of the present disclosure, the compensating unit 110 may compensate for only pixels having the monochrome stain using the fifth compensating value. The compensating unit 110 may perform the monochrome stain compensating operation for the local region of the display panel DP by using the fifth look-up table LUT5. The compensation performance for the display panel DP may be increased through the fifth look-up table LUT5 and the resources (e.g., calculation and storage) necessary for the compensation may be effectively utilized. Accordingly, the display device DD having increased reliability may be provided.

In an embodiment, the sixth look-up table LUT6 may store a sixth compensating value for compensating for the grayscale of the plurality of third defect pixels of the plurality of pixels PX in the second unit The sixth look-up table LUT6 may be a look-up table for compensating for a fine discoloration stain of the display panel DP.

According to an embodiment of the present disclosure, the compensating unit 110 may compensate for only pixels having the brightness difference stain using the sixth compensating value. The compensating unit 110 may perform the brightness difference compensating operation for the local region of the display panel DP by using the sixth look-up table LUT6. The compensation performance for the display panel DP may be increased through the sixth look-up table LUT6 and the resources (e.g., calculation and storage) necessary for the compensation may be utilized. Accordingly, the display device DD having increased reliability may be provided.

According to an embodiment, the compensating unit 110 may perform an optimized compensating operation depending on the types of stains using the first to sixth look-up tables LUT1 to LUT6. The compensation performance for the display panel DP may be increased through the first to sixth look-up tables LUT1 to LUT6 and the resources (e.g., calculation and storage) necessary for the compensation may be utilized. The stain of the plurality of pixels PX may be compensated. Accordingly, the display device DD having increased display quality may be provided.

However, embodiments of the present disclosure are not necessarily limited thereto. For example, the third look-up table LUT3 to the sixth look-up table LUT6 may be omitted in some embodiments.

Figure 5:
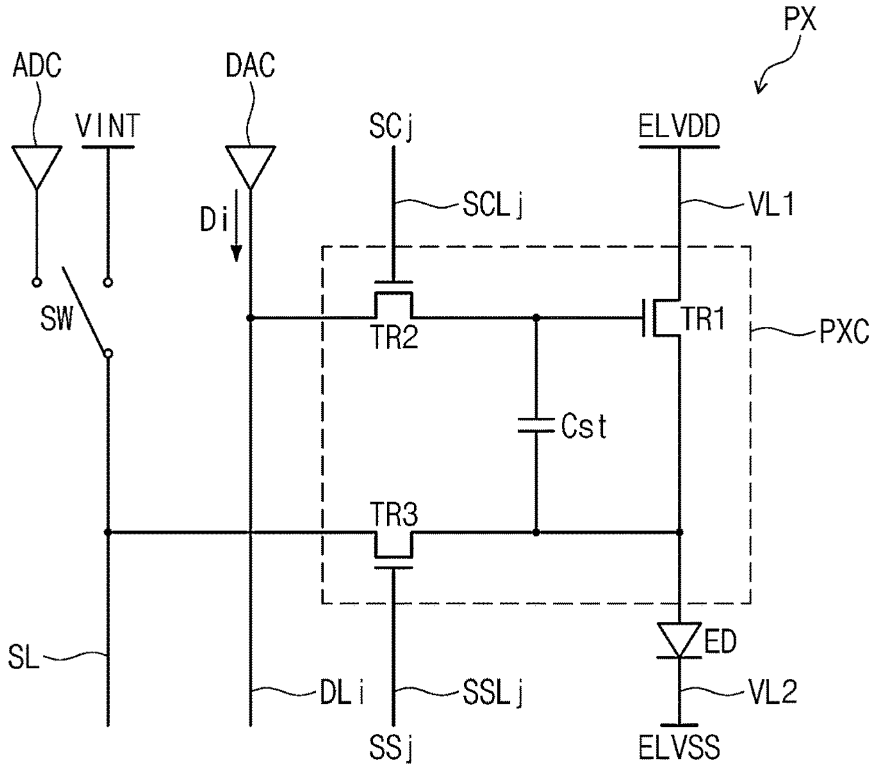
FIG. 5 is an equivalent circuit diagram of a pixel, according to an embodiment of the present disclosure.

FIG. 5 is an equivalent circuit diagram of a pixel according to an embodiment of the present disclosure.

FIG. 5 illustrates the equivalent circuit diagram of the pixel PX connected to an i-th data line DLi of the data lines DL1 to DLm illustrated in FIG. 3 in which I is an integer greater than or equal to 1, a j-th first scan line SCLi of the first scan lines SCL1 to SCLn in which j is an integer greater than or equal to 1, a j-th second scan line SSLj of the second scan lines SSL1 to SSLn which are illustrated in FIG. 3.

Each of the plurality of pixels PX illustrated in FIG. 3 may have the same configuration as that of the pixel PX illustrated in FIG. 5. According to an embodiment, the pixel PX includes the light emitting element ED and the pixel circuit PXC.

Referring to FIG. 5, the pixel circuit PXC may be electrically connected to the light emitting element ED, and may provide a current corresponding to a data signal Di received from the data line DLi to the light emitting element ED. According to an embodiment, the pixel circuit PXC of the pixel PX includes a first transistor TR1, a second transistor TR2, a third transistor TR3, and a capacitor Cst. According to an embodiment, each of the first to third transistors TR1 to TR3 may be an N-type transistor having a semiconductor layer including an oxide semiconductor. However, embodiments of the present disclosure are not necessarily limited thereto. According to an embodiment, each of the first to third transistors TR1 to TR3 may be a P-type transistor having a low-temperature polycrystalline silicon (LTPS) semiconductor layer. According to an embodiment, at least one of the first to third transistors TR1 to TR3 may be an N-type transistor and the remaining transistors of the first to third transistors TR1 to TR3 may be P-type transistors. In addition, according to an embodiment of the present disclosure, the circuit configuration of the pixel circuit PXC is not necessarily limited to the circuit configuration shown in FIG. 5. For example, the configuration of the pixel circuit PXC may be further modified.

The first scan line SCLj may transmit a first scan signal SCj, and the second scan line SSLj may transmit a second scan signal SSj. The data line DLi transmits the data signal Di. In an embodiment, the data signal Di may have the voltage level corresponding to the input image data I_RGB input to the display device DD (see FIG. 3).

In an embodiment, a first voltage line VL1 may transmit the first voltage ELVDD to the pixel circuit PXC, and a second voltage line VL2 may transmit the second voltage ELVSS to the cathode (e.g., a second terminal) of the light emitting element ED.

The first transistor TR1 includes a first electrode (e.g., a drain electrode) connected to the first voltage line VL1, a second electrode (e.g., a drain electrode) electrically connected to an anode (e.g., a first terminal) of the light emitting element ED, and a gate electrode connected to one terminal of the capacitor Cst. The first transistor TR1 may supply a driving current to the light emitting element ED, in response to the data signal Di transmitted through the data line DLi depending on the switching operation of the second transistor TR2. The first transistor TR1 may be referred to as the driving transistor TR1.

The second transistor TR2 includes a first electrode connected to the data line DLi, a second electrode connected to the gate electrode of the first transistor TR1, and a gate electrode connected to the first scan line SCLj. In an embodiment, the second transistor TR2 may be turned on in response to the scan signal SCj received through the first scan line SCLj and may transmit the data signal Di transmitted through the data line DLi to the gate electrode of the first transistor TR1.

The data line DLi may be electrically connected to a digital analog converter (DAC) of the data driving circuit 200.

The third transistor TR3 includes a first electrode connected to a sensing line SL, a second electrode connected to the anode of the light emitting element ED, and a gate electrode connected to the second scan line SSLj. In an embodiment, the third transistor T3 may be turned on in response to the second scan signal SSj received through the second scan line SSLj and transmit the initialization voltage VINT to the anode of the light emitting element ED.

One terminal of the capacitor Cst is connected to the gate electrode of the first transistor TR1 and an opposite terminal of the capacitor Cst is connected to the second electrode of the first transistor TR1, as described above. However, embodiments of the present disclosure are not necessarily limited thereto and the structure of the pixel PX may vary. For example, the number of transistors included in one pixel PX, the number of capacitors included in the pixel PX, and the connection relationship between the transistors and the capacitors may be variously modified.

In an embodiment, a switch SW may electrically connect an input terminal for initialization voltage VINT or an analog to digital converter (ADC) of the data driving circuit 200 with the sensing line SL in response to the control signal.

The inspection device TD (see FIG. 9) may sense a current flowing through the light emitting element ED through the sensing line SL.

Figure 6:
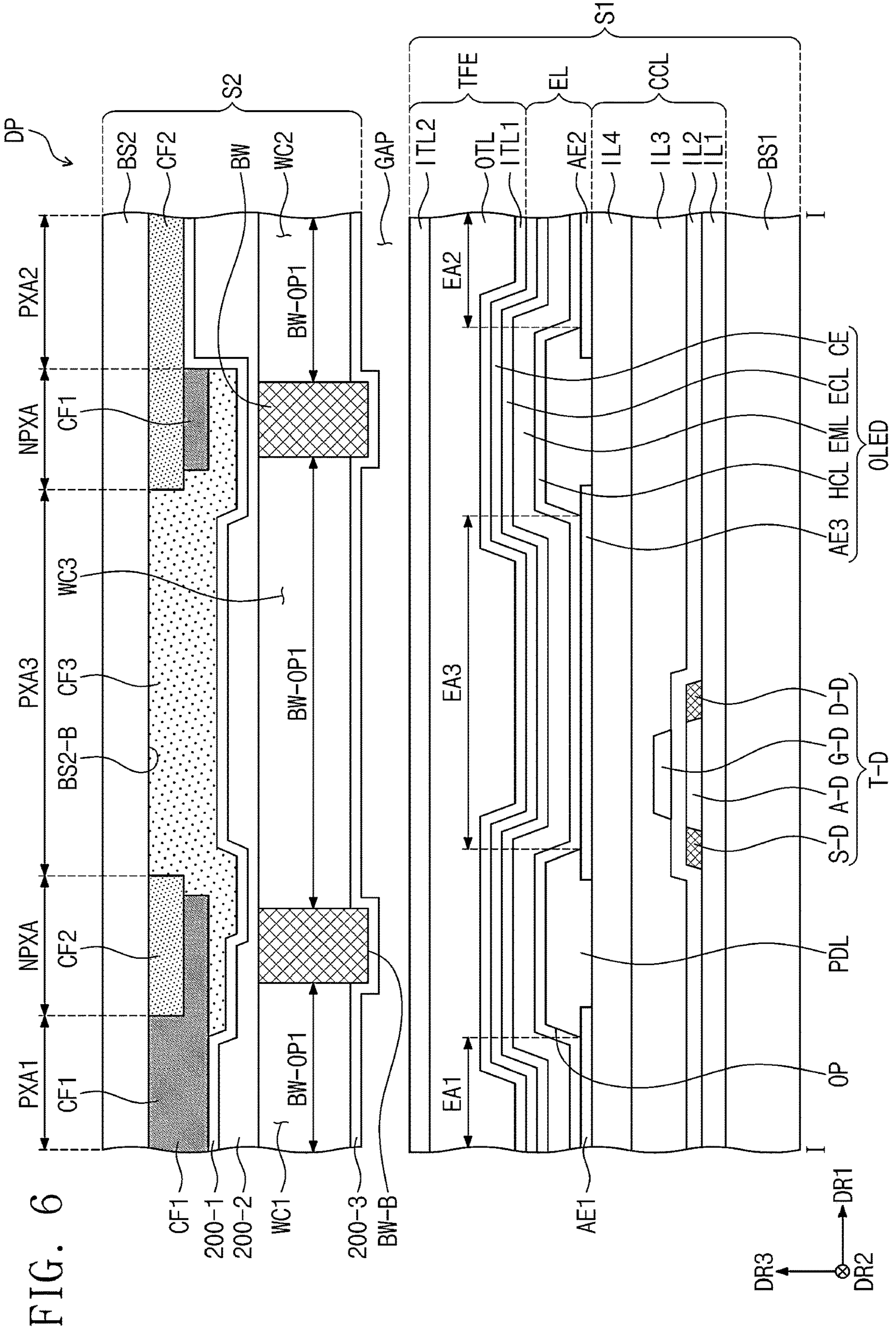
FIG. 6 is a cross-sectional view taken along I-I' of FIG. 2 according to an embodiment of the present disclosure.

FIG. 6 is a cross-sectional view taken along line I-I' of FIG. 2 according to an embodiment of the present disclosure.

Referring to FIG. 6, the display panel DP may include a first substrate S1 and the second substrate S2 facing and spaced apart from the first substrate S1 (e.g., in the third direction DR3). A specific cell gap GAP may be formed between the first substrate S1 and the second substrate S2. In an embodiment, the cell gap GAP may be maintained by a sealant coupling the first substrate S1 and the second substrate S2 to each other. The sealant may be disposed in the non-display region NDA (see FIG. 1). According to an embodiment of the present disclosure, a synthetic resin material may be disposed in the cell gap GAP. However, embodiments of the present disclosure are not necessarily limited thereto, and the structure of the display panel DP may vary.

In an embodiment, a first pixel region PXA1, a second pixel region PXA2, a third pixel region PXA3, and a peripheral region NPXA may be defined in the display panel DP.

The first substrate S1 may include a first base substrate BS1 (e.g., a base substrate), a circuit layer CCL, a display element layer EL, and a thin film encapsulation layer TFE. The circuit layer CCL may be disposed on (e.g., disposed directly thereon in the third direction DR3) the first base substrate BS1. In an embodiment, the circuit layer CCL may include a plurality of insulating layers, a plurality of conductive layers, and a semiconductor layer. The display element layer EL may be disposed on (e.g., disposed directly thereon in the third direction DR3) the circuit layer CCL. The thin film encapsulation layer TFE may be disposed on the display element layer EL (e.g., disposed directly thereon in the third direction DR3) and may seal the display element layer EL.

In an embodiment, the first base substrate BS1 may be a stack structure including a silicon substrate, a plastic substrate, a glass substrate, an insulating layer, or a plurality of insulating layers.

The circuit layer CCL may include a plurality of transistors and a plurality of insulating layers IL1, IL2, IL3, and IL4. In FIG. 6, one driving transistor T-D is provided only for the illustrative purpose. However, embodiments of the present disclosure are not necessarily limited thereto. In an embodiment, the plurality of insulating layers IL1, IL2, IL3, and IL4 may include the first insulating layer IL1, the second insulating layer IL2, the third insulating layer IL3, and the fourth insulating layer IL4. However, embodiments of the present disclosure are not necessarily limited thereto and the number of the insulating layers may vary. The driving transistor T-D may be referred to as the first transistor TR1 (see FIG. 5).

The first insulating layer IL1 may be disposed on (e.g., disposed directly thereon in the third direction DR3) the first base substrate BS1, and the driving transistor T-D may be disposed on (e.g., disposed directly thereon in the third direction DR3) the first insulating layer IL1. The driving transistor T-D may include an active A-D, a source S-D, a drain D-D, and a gate G-D.

The active A-D, the source S-D, and the drain D-D may be regions classified based on the doping concentration or conductivity of the semiconductor pattern. The active A-D, the source S-D, and the drain D-D may be disposed on the first insulating layer ILL. In an embodiment, the active A-D, the source S-D, and the drain D-D may have bonding force higher than the first base substrate BS1, with respect to the first insulating layer ILL.

The first insulating layer IL1 may be a barrier layer protecting a bottom surface of the active A-D, the source S-D, and the drain D-D. In this embodiment, the first insulating layer IL1 may protect the active A-D, the source S-D, and the drain D-D from the first base substrate BS1 itself, or prevent contaminants or moisture introduced through the first base substrate BS1 from being infiltrated into the active A-D, the source S-D, and the drain D-D. Alternatively, the first insulating layer IL1 may be a light blocking layer that blocks external light incident through the first base substrate BS1 from entering the active A-D. In this embodiment, the first insulating layer IL1 may further include a light blocking material.

The second insulating layer IL2 is disposed on the first insulating layer IL1 (e.g., disposed directly thereon in the third direction DR3) and may cover the active A-D, the source S-D, and the drain D-D. The second insulating layer IL2 may include an inorganic material. In an embodiment, the inorganic material may include at least one of silicon nitride, silicon oxynitride, silicon oxide, titanium oxide, or aluminum oxide.

The gate G-D may be disposed on the second insulating layer IL2 (e.g., disposed directly thereon in the third direction DR3). The third insulating layer IL3 may be disposed on the second insulating layer IL2 (e.g., disposed directly thereon in the third direction DR3) and may cover the gate G-D. The third insulating layer IL3 may be formed of a single layer or a plurality of layers. For example, the single layer may include an inorganic layer. In an embodiment, the plurality of layers may include an organic layer and an inorganic layer.

The fourth insulating layer IL4 may be disposed on the third insulating layer IL3 (e.g., disposed directly thereon in the third direction DR3). The fourth insulating layer IL4 may be formed of a single layer or a plurality of layers. For example, the single layer may include an organic layer. In an embodiment, the plurality of layers may include an organic layer and an inorganic layer. In an embodiment, the fourth insulating layer IL4 may be a planarization layer providing a flat surface thereon.

The display element layer EL may be disposed on the fourth insulating layer IL4 (e.g., disposed directly thereon in the third direction DR3). The display element layer EL may include a light emitting element OLED and a pixel defining layer PDL. According to an embodiment, the light emitting element OLED may be an organic light emitting element. However, embodiments of the present disclosure are not necessarily limited thereto. For example, the light emitting element OLED may be a micro-LED element or a nano-LED element. The pixel defining layer PDL may be an organic layer.

In an embodiment, the light emitting element OLED may include a first electrode AE3 (hereinafter, referred to as a third pixel electrode), a hole control layer HCL, a light emitting layer EML, an electron control layer ECL, and a second electrode CE (e.g., a common electrode). In an embodiment, the third pixel electrode AE3 may be separately provided for each pixel. In an embodiment, the light emitting element OLED may include a first light emitting element overlapping the first pixel region PXA1, a second light emitting element overlapping the second pixel region PXA2, a third light emitting element overlapping the third pixel region PXA3, and a fourth light emitting element overlapping the fourth pixel region PXA4. FIG. 6 illustrates a first pixel electrode AE1 included in the first light emitting element, a second pixel electrode AE2 included in the second light emitting element, and the third pixel electrode AE3 included in the third light emitting element.

In an embodiment, the first pixel electrode AE1 may be disposed to correspond to the first pixel region PXA1, the second pixel electrode AE2 may be disposed to correspond to the second pixel region PXA2, and the third pixel electrode AE3 may be disposed to correspond to the third pixel region PXA3. In this case, the wording "corresponding" refers to that the two components overlap each other when viewed in the thickness direction DR3 of the display panel DP, and are not necessarily limited to having the same area as each other. For example, in some embodiments portions of the two components may not overlap each other in the third direction DR3.

The first pixel electrode AE1, the second pixel electrode AE2, and the third pixel electrode AE3 may be disposed on the fourth insulating layer IL4 (e.g., disposed directly thereon in the third direction DR3). Each of the first pixel electrode AE1, the second pixel electrode AE2, and the third pixel electrode AE3 may be electrically connected, directly or indirectly, to a relevant driving transistor. For example, the second pixel electrode AE2 may be directly or indirectly connected to the driving transistor T-D illustrated in FIG. 6.

The pixel defining layer PDL may expose a portion of each of the first pixel electrode AE1, the second pixel electrode AE2, and the third pixel electrode AE3, such as a central portions thereof (e.g., in the first direction DR1). For example, a light emitting opening OP may be defined in the pixel defining layer PDL. A portion of each of the first pixel electrode AE1, the second pixel electrode AE2, and the third pixel electrode AE3 may be exposed through the light emitting opening OP.

A first light emitting region EA1, a second light emitting region EA2, and a third light emitting region EA3 may be defined by the light emitting openings OP, respectively. In addition, the first light emitting region EA1 may be defined corresponding to the first pixel region PXA1, the second light emitting region EA2 may be defined corresponding to the second pixel region PXA2, and the third light emitting region EA3 may be defined corresponding to the third pixel region PXA3. In this case, the wording "corresponding" refers to that the two components overlap each other when viewed in the thickness direction DR3 of the display panel DP, and are not necessarily limited to having the same area as each other.

In an embodiment, the hole control layer HCL, the light emitting layer EML, the electron control layer ECL, and the second electrode CE may be disposed commonly in the first pixel region PXA1, the second pixel region PXA2, the third pixel region PXA3, and the peripheral region NPXA. The hole control layer HCL may include a hole transport layer and may further include a hole injection layer.

The light emitting layer EML may have a single layer structure or a tandem structure. In an embodiment, the light emitting layer EML may emit blue light as source light. The blue light may include a wavelength ranging from 410 nm to 480 nm. For example, the emission spectrum of blue light may have a peak wavelength in the range of 440 nm to 460 nm. The light emitting layer EML may be disposed in common in the first to third pixel regions PXA1, PXA2, and PXA3 or may be independently arranged. The wording "independently arranged" refers to the light emitting layer EML being separately provided for each of the first to third pixel regions PXA1, PXA2, and PXA3.

The electron control layer ECL may include an electron transport layer, and may further include an electron injection layer. The second electrode CE may be disposed on the electron control layer ECL (e.g., disposed directly thereon in the third direction DR3). In an embodiment, the second electrode CE may be disposed in common in the plurality of pixels PX (see FIG. 1).

The thin film encapsulation layer TFE may be disposed on the second electrode CE. For example, in an embodiment the thin film encapsulation layer TFE may be directly disposed on the display element layer EL (e.g., in the third direction DR3). In an embodiment, the thin film encapsulation layer TFE may include a first inorganic encapsulation layer ITL1, an organic encapsulation layer OTL, and a second inorganic encapsulation layer ITL2 sequentially stacked (e.g., in the third direction DR3). The organic encapsulation layer OTL may be disposed between the first inorganic encapsulation layer ITL1 and the second inorganic encapsulation layer ITL2 (e.g., in the third direction DR3). The first inorganic encapsulation layer ITL1 and the second inorganic encapsulation layer ITL2 may be formed by depositing an inorganic material, and the organic encapsulation layer OTL may be formed by depositing, printing, or coating an organic material.

The first inorganic encapsulation layer ITL1 and the second inorganic encapsulation layer ITL2 protect the display element layer EL from moisture and oxygen, and the organic encapsulation layer OTL protects the display element layer EL from foreign substances such as dust particles. In an embodiment, the first inorganic encapsulation layer ITL1 and the second inorganic encapsulation layer ITL2 may include at least one of silicon nitride, silicon oxy nitride, silicon oxide, titanium oxide, or aluminum oxide. The organic encapsulation layer OTL may include a polymer, for example, an acrylic organic layer. However, embodiments of the present disclosure are not necessarily limited thereto.

FIG. 6 illustrates that the thin film encapsulation layer TFE includes two inorganic layers and one organic layer. However, embodiments of the present disclosure are not necessarily limited thereto. For example, in an embodiment the thin film encapsulation layer TFE may contain three inorganic layers and two organic layers, and in this embodiment, the inorganic layer and the organic layer may be alternately stacked. In some embodiments, the display panel DP may further include a refractive index control layer formed on the thin film encapsulation layer TFE to increase the emission efficiency.

The second substrate S2 may be disposed on the first substrate S1 (e.g., in the third direction DR3). In an embodiment, the second substrate S2 may include a second base substrate BS2 (e.g., a cover base substrate), a first color filter CF1, a second color filter CF2, a third color filter CF3, a first light control pattern WC1, a second light control pattern WC2, a third light control pattern WC3, a partition BW, and a plurality of insulating layers 200-1, 200-2, and 200-3.

In an embodiment, the second base substrate BS2 may be in a stack structure including a silicon substrate, a plastic substrate, a glass substrate, an insulating layer, or a plurality of insulating layers. A bottom surface BS2-B of the second base substrate BS2 may be flat.

A plurality of color filters CF1, CF2, and CF3 may be disposed on one surface of the second base substrate BS2. For example, the plurality of color filters CF1, CF2, and CF3 may be disposed on the bottom surface of the second base substrate BS2. The first color filter CF1 may be disposed to overlap the first light emitting region EA1 (e.g., in the third direction DR3), the second color filter CF2 may be disposed to overlap the second light emitting region EA2 (e.g., in the third direction DR3), and the third color filter CF3 may be disposed to overlap the third light emitting region EA3 (e.g., in the third direction DR3).

The second color filter CF2 may be disposed in the second pixel region PXA2 and the peripheral region NPXA. The plurality of openings may be defined in the second color filter CF2. The plurality of openings may define the first pixel region PXA1 and a third pixel region PXA3. The first color filter CF1 may be disposed to overlap the first pixel region PXA1 (e.g., in the third direction DR3), and the third color filter CF3 may be disposed to overlap the third pixel region PXA3 (e.g., in the third direction DR3).

The third color filter CF3 may be disposed on the partition BW in the peripheral region NPXA. The first color filter CF1 may be disposed on the third color filter CF3. The second color filter CF2 may be disposed on the first color filter CF1.

Each of the first to third color filters CF1, CF2, and CF3 transmits light in a specific wavelength range and blocks light having a wavelength outside the corresponding wavelength range. Each of the first to third color filters CF1, CF2, and CF3 includes a base resin and a dye and/or pigment dispersed in the base resin. A base resin is a medium in which dyes and/or pigments are dispersed and may be made of various resin compositions which may be generally referred to as a binder.

The first color filter CF1 may transmit the first color light, the second color filter CF2 may transmit the source light provided from the light emitting layer EML, and the third color filter CF3 may transmit the third color light. For example, in an embodiment the first color filter CF1 may be a red color filter, the second color filter CF2 may be a blue color filter, and the third color filter CF3 may be a green color filter. In an embodiment, the first color filter CF1 and the third color filter CF3 may be yellow color filters. In this embodiment, the first color filter CF1 and the third color filter CF3 may be provided to be connected to each other.

The first color filter CF1 may be disposed adjacent to the second color filter CF2. The third color filter CF3 may overlap the first color filter CF1 and the second color filter CF2 (e.g., in the third direction DR3). A region overlapping all of the plurality of color filters CF1, CF2, and CF3 may block light. In this embodiment, a black component including a light-shielding material may not be included. The region in which all of the plurality of color filters CF1, CF2, and CF3 overlap may correspond to the peripheral region NPXA and may correspond to the partition BW. In this case, the wording "corresponding" refers to that the two components overlap each other when viewed in the thickness direction DR3 of the display panel DP, and are not necessarily limited to having the same area as each other.

The first insulating layer 200-1 may be disposed under (e.g., directly under in the third direction DR3) the first color filter CF1, the second color filter CF2, and the third color filter CF3, and may cover the first color filter CF1, the second color filter CF2, and the third color filter CF3. The second insulating layer 200-2 may cover the first insulating layer 200-1 and may have a flat bottom surface. In an embodiment, the first insulating layer 200-1 may be an inorganic layer, and the second insulating layer 200-2 may be an organic layer. However, embodiments of the present disclosure are not necessarily limited thereto. For example, in an embodiment, the second insulating layer 200-2 may be omitted.

The partition BW may be disposed under the second insulating layer 200-2. The partition BW may be disposed in the peripheral region NPXA. A plurality of first openings BW-OP1 may be defined in the partition BW. The partition BW may include a material having a transmittance less than or equal to a specific value. For example, in an embodiment the partition BW may include a light-shielding material, and for example, may include a typical black component. The partition BW may include a black dye and a black pigment mixed with the base resin. For example, in an embodiment the partition BW may include at least one compound selected from propylene glycol methyl ether acetate, 3-methoxy-n-butyl acetate, acrylate monomer, acryl320 monomer, organic pigment, and acrylate ester.

A bottom surface BW-B of the partition BW may be defined on a surface facing the thin film encapsulation layer TFE.

The plurality of first openings BW-OP1 may correspond to the first pixel region PXA1, the second pixel region PXA2, and the third pixel region PXA3, respectively. The plurality of first openings BW-OP1 may correspond to the first light emitting region EA1, the second light emitting region EA2, and the third light emitting region EA3, respectively. In this case, the wording "corresponding" refers to that the two components overlap each other when viewed in the thickness direction DR3 of the display panel DP, and are not necessarily limited to having the same area as each other.

In an embodiment, the first light control pattern WC1 is disposed inside one of the plurality of first openings BW-OP1, and may convert the source light into the first color light. The second light control pattern WC2 is disposed inside one of the plurality of first openings BW-OP1 and may transmit source light. The third light control pattern WC3 is disposed inside one of the plurality of first openings BW-OP1, and may convert the source light into the second color light.

In an embodiment, each of the first light control pattern WC1, the second light control pattern WC2, and the third light control pattern WC3 may be formed through an inkjet process. Compositions may be provided in spaces (e.g., the plurality of first openings BW-OP1), which are defined by the partition BW, to form the first light control pattern WC1, the second light control pattern WC2, and the third light control pattern WC3.

In an embodiment, each of the first light control pattern WC1 and the third light control pattern WC3 may include a base resin, a quantum dot, and scattering particles, and the second light control pattern WC2 may include a base resin and scattering particles. However, embodiments of the present disclosure are not necessarily limited thereto. For example, in an embodiment each of the first light control pattern WC1, the second light control pattern WC2, and the third light control pattern WC3 includes a base resin and scattering particles, and at least two of the first light control pattern WC1, the second light control pattern WC2, and the third light control pattern WC3 may include quantum dots. According to an embodiment of the present disclosure, the scattering particles may be omitted from any one of the first light control pattern WC1, the second light control pattern WC2, and the third light control pattern WC3.

The base resin is a medium in which quantum dots or scattering particles are dispersed, and may be formed of various resin compositions which may be generally referred to as a binder. However, embodiments of the present disclosure are not necessarily limited thereto, and any medium for dispersing and disposing quantum dots in the present specification may be referred to as a base resin regardless of its name, other additional functions, constituent materials, etc. The base resin may be a polymer resin. For example, in an embodiment the base resin may be acrylic resin, urethane resin, silicone resin, or epoxy resin. The base resin may be a transparent resin.

In an embodiment, the scattering particles may be titanium oxide $TiO_2$ or silica-based nanoparticles. The scattering particles may scatter incident light to increase the amount of light provided to the outside. According to an embodiment of the present disclosure, at least one of the first light control pattern WC1 and the third light control pattern WC3 may not include scattering particles.

Quantum dots may be particles which convert wavelengths of incident light. Quantum dots are materials having a crystal structure having the size of several nanometers, and including hundreds to thousands of atoms, and exhibit a quantum confinement effect in which the energy band gap increases due to the smaller size thereof. When light having a wavelength higher than the band gap enters the quantum dot, the quantum dot absorbs the light, becomes excited, and falls to the ground state while emitting light having a specific wavelength. The emitted wavelength light has a value corresponding to the band gap. By adjusting the size and composition of quantum dots, light emission characteristics due to the quantum confinement effect may be adjusted.

In an embodiment, the core of each of the quantum dots may be selected from group II-VI compounds, group III-V compounds, group III-VI compounds, group I-III-VI compounds, group IV-VI compounds, group IV elements, group IV compounds, and combinations thereof.

In an embodiment, the Group II-VI compound may be selected from the group consisting of a binary compound selected from the group consisting of CdSe, CdTe, CdS, ZnS, ZnSe, ZnTe, ZnO, HgS, HgSe, HgTe, MgSe, MgS, and the mixture thereof; a ternary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and the mixture thereof; and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and the mixture thereof.

In an embodiment, the group III-VI compound may include a binary compound, such as $In_2S_3$ and $In_2Se_3$, a ternary compound such as $InGaS_3$, and $InGaSe_3$, or the combination thereof.

In an embodiment, the group I-III-VI compound may be selected from a ternary compound selected from the group consisting of AgInS, $AgInS_2$, CuInS, $CuInS_2$, $AgGaS_2$, CuGaS2 $CuGaO_2$, $AgGaO_2$, $AgAlO_2$ and the mixture thereof or a quaternary compound selected from the group consisting of $AgInGaS_2$, and $CuInGaS_2$.

In an embodiment, the group III-V compound may be selected from the group consisting of a binary compound selected from the group consisting of GaN, GaP, GaAs, GaSb, AlN, AlP, AlAs, AlSb, InN, InP, InAs, InSb, and the mixture thereof; a ternary compound selected from the group consisting of GaNP, GaNAs, GaNSb, GaPAs, GaPSb, AlNP, AlNAs, AlNSb, AlPAs, AlPSb, InGaP, InAlP, InNP, InNAs, InNSb, InPAs, InPSb, and the mixture thereof; and a quaternary compound selected from the group consisting of GaN, GaP, GaAs, GaSb, AlN, AlP, AlAs, AlSb, InN, InP, InAs, InSb, and the mixture thereof. Meanwhile, the group III-V compound may further include group II metal. For example, InZnP may be selected as the group III-II-V compound.

In an embodiment, the group IV-VI compound may be selected from the group consisting of a binary compound including SnS, SnSe, SnTe, PbS, PbSe, PbTe and the mixture of thereof; a ternary compound selected from the group consisting of SnSeS, SnSeTe, SnSTe, PbSeS, PbSeTe, PbSTe, SnPbS, SnPbSe, SnPbTe and the mixture thereof; and a quaternary compound selected from the group consisting of SnPbSSe, SnPbSeTe, SnPbSTe, and the mixture thereof. The group IV element may be selected from the group consisting of Si, Ge, and the mixture thereof. The group IV element may be selected from the group consisting of S320, SiGe, and the mixture thereof.

In this embodiment, the binary compound, the ternary compound, or the quaternary compound may be present at a uniform concentration in a particle, or may be present at different concentration distributions in the same particle. In addition, one quantum dot may have a core/shell structure to surround another quantum dot. The interface surface between the core and the shell may have a concentration gradient in which the concentration of the element is lowered toward the center.

According to some embodiments, the quantum dots may have the core-shell structure including a core including the nano-crystal and the shell to surround the core. The shell of the above quantum dots may serve as a protective layer to maintain semiconductor properties by preventing chemical denaturation of the above core and/or a charging layer to apply electrophoretic properties to the quantum dots. The shell may be a single layer or a multiple layer. The interface surface between the core and the shell may have a concentration gradient in which the concentration of the element present in the shell decreases towards the center. Examples of the shell of the quantum dots may include an oxide of metal or non-metal, a semiconductor compound, or the combination thereof.

For example, in an embodiment the metal or non-metal oxide may be a binary compound, such as $SiO_2$, $Al_2O_3$, $TiO_2$, ZnO, MnO, $Mn_2O_3$, $Mn_3O_4$, CuO, $Fe_2O_3$, $Fe_3O_4$, CoO, $Co_3O_4$, and NiO, or a ternary compound, such as $MgAl_2O_4$, $CoFe_2O_4$, $NiFe_2O_4$, and $CoMn_2O_4$. However, embodiments of the present disclosure are not necessarily limited thereto.

In addition, in an embodiment the semiconductor compound may be CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb, or AlSb. However, embodiments of the present disclosure are not necessarily limited thereto.

The quantum dot may have a full width of half maximum (FWHM) of a light emission wavelength spectrum of about 45 nm or less, such as about 40 nm or less, such as about 30 nm or less, and may increase the color purity or color reproducibility in this range. In addition, since the light emitted through the quantum dot is emitted in all directions, the light viewing angle may be increased.

In addition, the form of quantum dots is not necessarily limited to those commonly used in the present technical field. For example, spherical, pyramid, multi-arm, or cube (cub320) nanoparticles, nanotubes, nanowires, nano-fibers, and/or nano-plate particles may be used.

The quantum dots may adjust the color of the light emitted depending on the particle size, and accordingly, quantum dots may have various light emitting colors such as a blue color, a red color, and a green color.

The third insulating layer 200-3 may cover the partition BW, the first light control pattern WC1, the second light control pattern WC2, and the third light control pattern WC3. For example, the third insulating layer 200-3 may be an inorganic layer sealing the partition BW, the first light control pattern WC1, the second light control pattern WC2, and the third light control pattern WC3.

Figure 7:
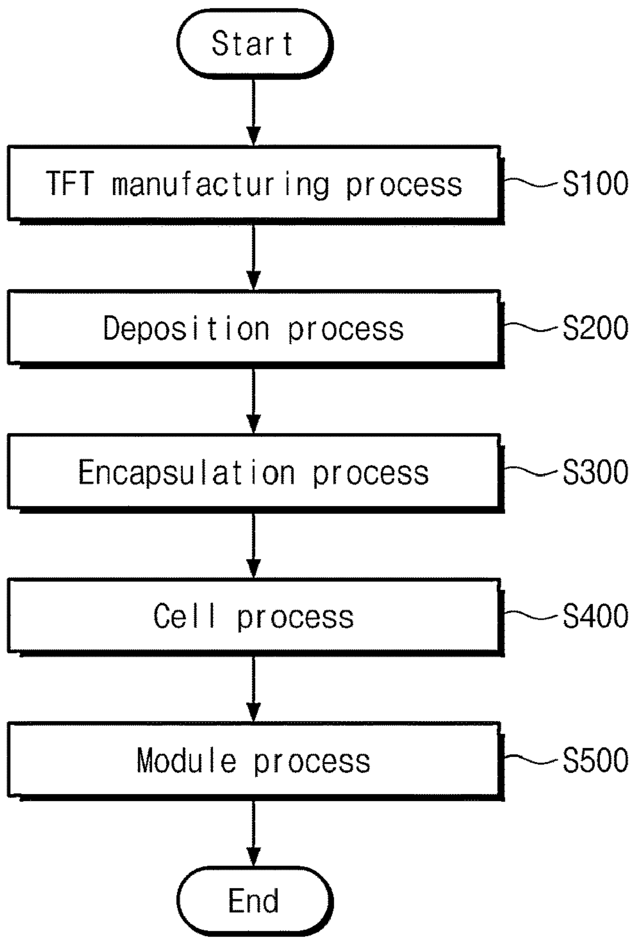
FIG. 7 is a flowchart illustrating a method of manufacturing a display device according to an embodiment of the present disclosure.

FIG. 7 is a flowchart illustrating a method of manufacturing a display device according to an embodiment of the present disclosure.

Referring to FIG. 7, the display device DD may be manufactured by specific processes. In an embodiment, the display device DD may be manufactured through a thin film transistor TFT manufacturing process in block S100, a deposition process in block S200, an encapsulation process in block S300, a cell process in block S400, and a module process in block S500.

The TFT manufacturing process S100 may refer to a process of forming a thin film transistor TFT. The thin film transistor may output a signal by controlling an on/off state of a pixel, which is the smallest unit of the display panel. The thin film transistor may be seen as a type of a smaller semiconductor to serve as a switch of turning on or off light by controlling an electrical signal. In this regard, the TFT manufacturing process may be understood as a process of manufacturing an electrode switch of a pixel, which is a basic element of a display, on a glass substrate. The thin film transistor may include the first transistor TR1, the second transistor TR2, and the third transistor TR3.

According to an embodiment, the thin film transistors (TFT) may be formed through a plurality of mask processes. In an embodiment, the mask process may include a series of processes, including a thin film deposition process, a cleaning process, a photolithography process, an etching process, a strip process, and an inspection process. In each mask process, defects may be caused due to foreign substances.

The deposition process in block S200 may refer to a process of chemically or physically forming an insulating layer, a semiconductor film, a metal film, or the like on a glass substrate.

The encapsulation process in block S300 may refer to a process of blocking oxygen and moisture such that the organic material and the electrode, which are to allow the light emitting element ED (see FIG. 5) to emit light, are prevented from losing light emitting characteristics through the reaction between oxygen and moisture. In an embodiment, the encapsulation process S300 may further include a process for combining the first substrate S1 (see FIG. 6) and the second substrate S2 (see FIG. 6).

The cell process in block S400 may refer to a process for cutting the manufactured TFT substrate to be made into a part (e.g., component) depending on the purpose.

The module process in block S500 may refer to a manufacturing process to attach an accessory to a panel, which has undergone a cell process, and modularize the resultant structure to be used as a part (e.g., a component). For example, the part may include the driving circuit DC (see FIG. 3) and the voltage generator 300 (see FIG. 3).

Figure 8:
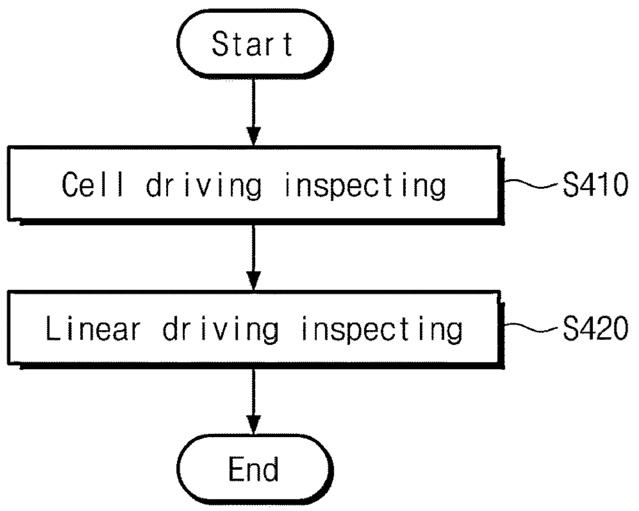
FIG. 8 is a flowchart illustrating a portion of a cell process according to an embodiment of the present disclosure.

FIG. 8 is a flowchart illustrating a portion of a cell process according to an embodiment of the present disclosure.

Referring to FIGS. 7 and 8, the cell process S400 may include a cell driving inspection step in block S410 and a linear driving inspection step in block S420.

FIG. 9 illustrates a stain compensating system for performing the cell driving inspection step and the linear driving inspection step according to an embodiment of the present disclosure.

Referring to FIGS. 8 and 9, a stain compensating system SCA may include the display panel DP provided in the cell process in block S400, an imaging unit CAM, and the inspection device TD provided in the cell process S400.

The imaging unit CAM may generate image data IMD by capturing an image (IM, see FIG. 1) displayed by the display panel DP.

The inspection device TD may receive the image data IMD and generate a first measurement data DATA1 and a second measurement data DATA2, respectively.

In an embodiment, the inspection device TD may include an inspection storage unit 510 and a defect characteristic classifying unit 520.

The first measurement data DATA1 and the second measurement data DATA2 may be stored in the inspection storage unit 510.

In an embodiment, the defect characteristic classifying unit may classify the plurality of pixels PX (see FIG. 3) into a first defect pixel having a first defect, a second defect pixel having a second defect, or a third defect pixel having a third defect, based on the first measurement data DATA1 and the second measurement data DATA2. The details thereof will be described later.

Figure 10:
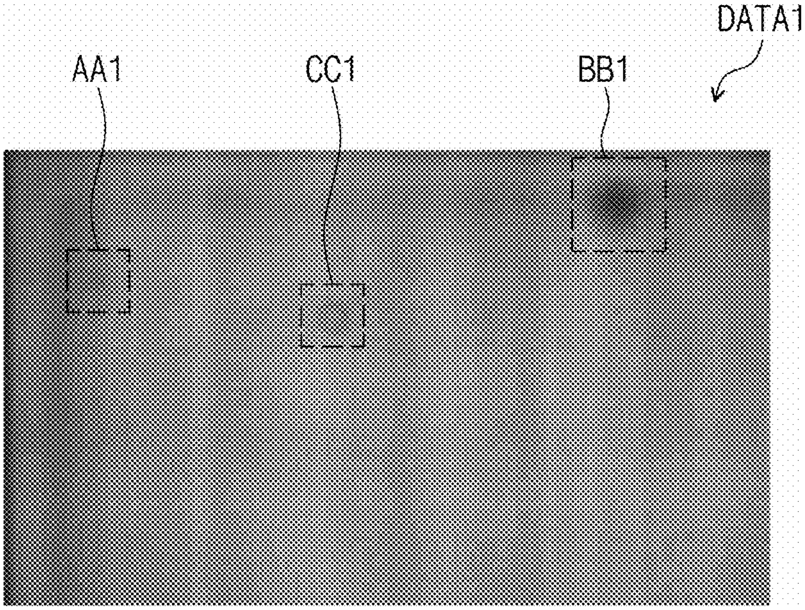
FIG. 10 illustrates first measurement data according to an embodiment of the present disclosure.
Figure 11A:
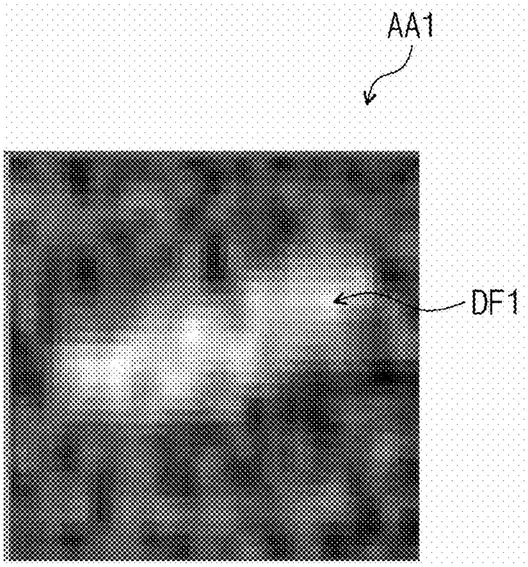
FIGS. 11A to 11C illustrate enlarged portions of first measurement data according to embodiments of the present disclosure.
Figure 11B:
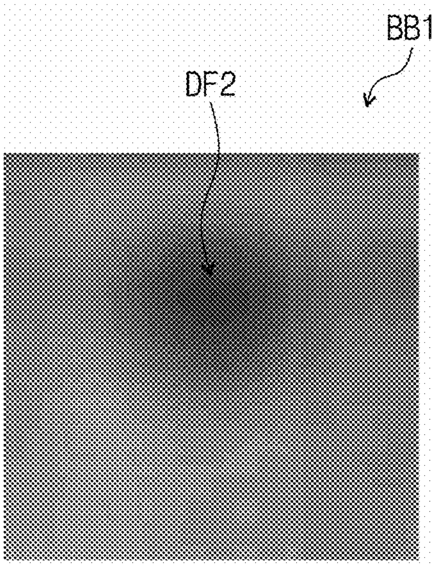
Figure 11C:
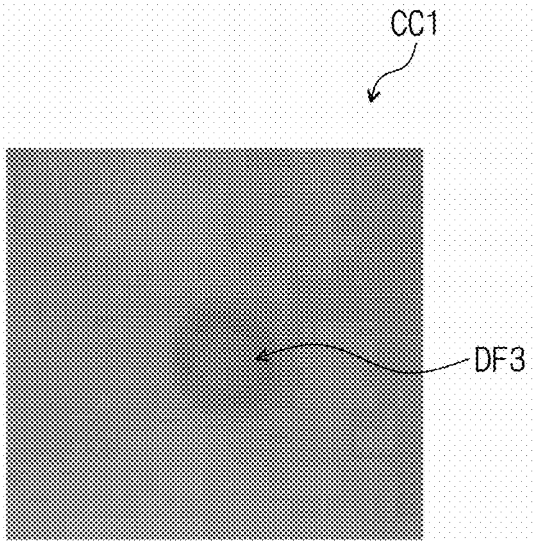

FIG. 10 illustrates first measurement data according to an embodiment of the present disclosure, and FIGS. 11A to 11C illustrate enlarged portions of the first measurement data according to embodiments of the present disclosure.

Referring to FIGS. 7 to 11C, the first measurement data DATA1 may be data obtained by measuring the display panel DP through an array inspection device employing an electrical scheme and the imaging unit CAM in the cell driving inspection step in block S410 in a state where the driving circuit DC (see FIG. 3) and the voltage generator 300 (see FIG. 3) are not connected, such as the display panel is not connected to (e.g., driven by) the driving controller 100.

The inspection device TD may convert the received image data IMD into a gray scale to generate the first measurement data DATA1. For example, the first measurement data DATA1 may include an output value of a sensing line SL (see FIG. 5) of each of the plurality of pixels PX obtained using the image data IMD measured using the imaging unit CAM and a full contact array tester. In an embodiment, the array tester employing the electrical scheme may be a device which charges the capacitor Cst (see FIG. 5) of each of the plurality of pixels PX with a specific amount of charges and checks a current value from each pixel to inspection a pixel defect.

In an embodiment, the display panel DP may have a stain defect as illustrated in the first measurement data DATA1. The stain defect may be caused by the brightness difference between a certain region and another region. For example, in some instances the stain defect may have a dot shape, a line shape, a band shape, a circle shape, or a polygonal shape, and may have an irregular shape. The stain defect may be caused by defect pixels having a greater brightness deviation than that of another pixel, due to the errors or the manufacturing defects caused in the manufacturing process.

A first region AA1 may be a region having a fine monochrome stain DF1. The fine monochrome stain DF1 may be caused by a defect in the second substrate S2 (see FIG. 6) including the light control pattern and the color filter. The fine monochrome stain DF1 may be a stain having a size less than the area of 10×10 pixels. For example, when the size of the fine monochrome stain DF1 is greater than or equal to the area of the 10×10 pixels, the fine monochrome stain DF1 may be classified as a monochrome stain. In the present specification, a fine stain may refer to a stain having a size less than the area of 10×10 pixels.

The fine monochrome stain DF1 may be caused by moisture that is absorbed or mixed between processes for combining the first substrate S1 (see FIG. 6) and the second substrate S2 (see FIG. 6) in the encapsulation process in block S300. The absorption of the moisture may be caused by a delay between processes, and the aeration may be caused by a process limit resulting from the area of the pixel (PX) being reduced.

The fine monochrome stain DF1 may be a stain viewed due to a brightness difference in a monochromatic pattern due to abnormal efficiency of light conversion by the absorption of the moisture and/or aeration. For example, the fine monochrome stain DF1 may be formed in the first and third pixel regions PXA1 and PXA3 for the first and third light control patterns WC1 and WC3 including quantum dots, and may not be formed in the second pixel region PXA2 for the second light control pattern WC2 not including quantum dots.

A second region BB1 may be a region having a discoloration stain DF2. The discoloration stain DF2 may be caused due to a defect in the second substrate S2 (see FIG. 6) including the light control pattern and the color filter.

The discoloration stain DF2 may be a color uniformity defect resulting from the recognition of the gray pattern. The discoloration stain DF2 may be caused by the absorption of the moisture and/or aeration between processes of combining the first substrate S1 (see FIG. 6) with the second substrate S2 (see FIG. 6) in the encapsulation process in block S300.

The fine monochrome stain DF1 and the discoloration stain DF2 may be formed, even when the second substrate S2 includes a micro-lens array. For example, according to an embodiment of the present disclosure, the stain compensating system SCA may sense the fine monochrome stain and the discoloration stain in the display device including a micro-lens array.

A third region CC1 may be a region in which a brightness difference stain DF3 is caused. In an embodiment, the brightness difference stain DF3 may be caused due to a defect in the first substrate S1 (see FIG. 6) including the driving transistor and the light emitting element.

The brightness difference stain DF3 may be caused by defects in each of the threshold voltage of the driving transistor (TR1, see FIG. 5), the mobility, and light emitting elements (ED, see FIG. 5).

Figure 12:
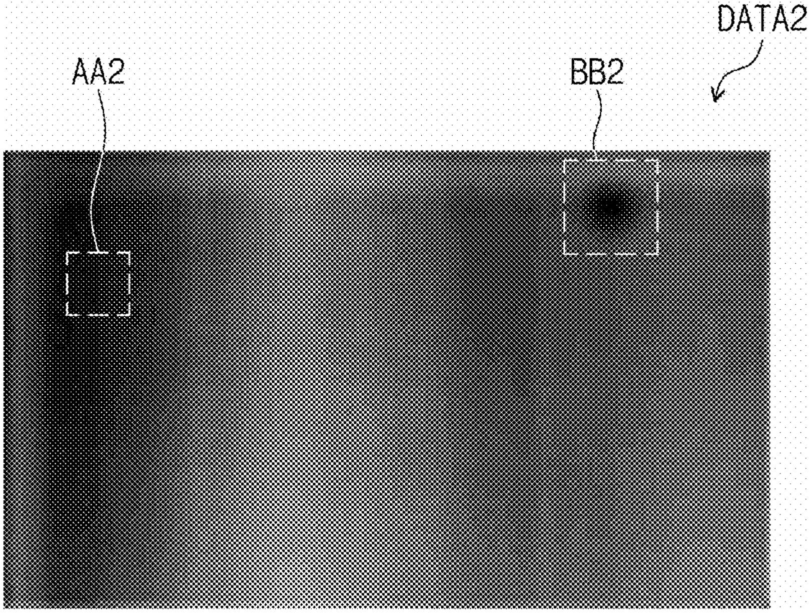
FIG. 12 illustrates second measurement data according to an embodiment of the present disclosure.
Figure 13A:
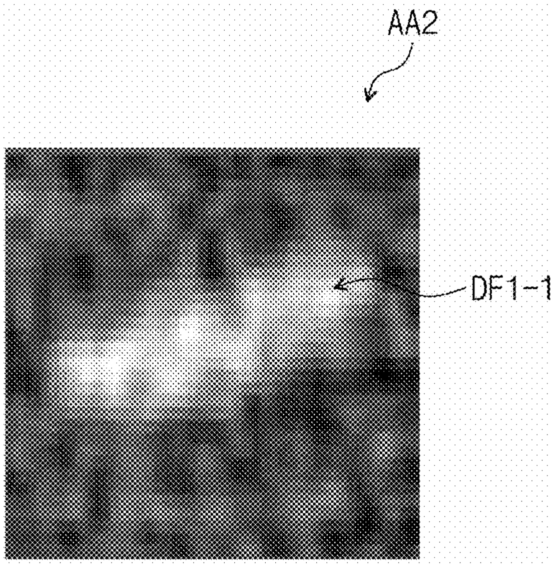
FIGS. 13A and 13B are enlarged views of a portion of second measurement data according to embodiments of the present disclosure.
Figure 13B:
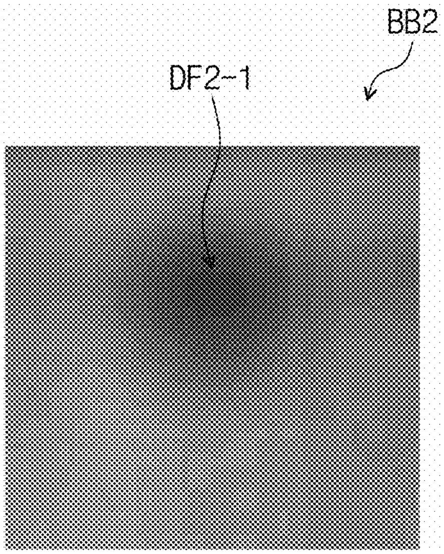

FIG. 12 illustrates second measurement data according to an embodiment of the present disclosure, and FIGS. 13A and 13B are enlarged views of a portion of second measurement data according to an embodiment of the present disclosure.

Referring to FIGS. 7 to 9, 12 to 13B, the second measurement data DATA2 may be data measured by linear driving the display panel DP in the linear driving inspection step in block S420 in which the driving circuit DC (see FIG. 3) and the voltage generator 300 (see FIG. 3) are not connected, and by using the imaging unit CAM.

In an embodiment, the inspection device TD may convert the received image data IMD into data in a gray scale level to generate the second measurement data DATA2.

A first region AA2 may be a region in which a fine monochrome stain DF1-1 is generated. The first region AA2 may be a region corresponding to the first region AA1 (see FIG. 10) of the first measurement data DATA1 (see FIG. 10). The fine monochrome stain DF1-1 may be a stain caused by the same defect as the fine monochrome stain DF1 (see FIG. 11A) measured in relation to the first measurement data (DATA1, see FIG. 10).

A second region BB2 may be a region in which a discoloration stain DF2-1 is caused. The second region BB2 may be a region corresponding to the second region BB1 (see FIG. 10) of the first measurement data DATA1 (see FIG. 10). The discoloration stain DF2-1 may be a stain caused by the same defect as the discoloration stain DF2 (see FIG. 11B) measured in relation to the first measurement data DATA1 (see FIG. 10).

The brightness difference stain DF3 (see FIG. 11C) may not be included in the second measurement data DATA2. The imaging unit CAM may not measure stains caused by defects in driving transistors (TR1, see FIG. 5) and/or defects in light emitting elements (ED, see FIG. 5) of multiple pixels (PX) by linear driving of the display panel DP. For example, the second measurement data DATA2 may include data in which the first defect is compensated for.

In an embodiment, the inspection device TD may predict a first defect or a second defect of the plurality of pixels PX (see FIG. 3) by comparing the first measurement data DATA1 (see FIG. 10) with the second measurement data DATA2. For example, in an embodiment the inspection device TD may classify a pixel, which has the brightness difference stain DF3 (see FIG. 11C) caused by the first defect, as a first defect pixel, and a pixel, which has the fine monochrome stain DF1 (see FIG. 11C) caused by the second defect, as a second defect pixel, based on the first measurement data DATA1 (see FIG. 10) and the second measurement data DATA2.

In addition, in an embodiment the inspection device TD may further classify a pixel, which has the discoloration stain DF2 (see FIG. 11B), as a third defect pixel, based on the first measurement data DATA1 (see FIG. 10) and the second measurement data DATA2.

For example, in an embodiment the inspection device TD may sort the second defect pixel out based on the second measurement data DATA2 and may sort the first defect pixel out by excluding the second defect pixel from the first measurement data DATA1 (see FIG. 10).

According to an embodiment of the present disclosure, the stain compensating system SCA may predict a defect characteristic based on the first measurement data DATA1 (see FIG. 10) and the second measurement data DATA2 which are measured in the cell process S400. Thereafter, the inspection device TD may specify defect pixels of the plurality of pixels PX which are classified as having a defect corresponding to each of defect characteristics, and may create the look-up tables LUT1 to LUT6 (see FIG. 4) for optimizing the compensation for the defect pixels, and may provide the look-up tables LUT1 to LUT6 to the driving controller 100 (see FIG. 4). The driving controller 100 (see FIG. 4) may prevent stain defects from occurring in the image (IM, see FIG. 1) displayed on the display panel DP by compensating the defect pixels. Therefore, it is possible to provide the display device DD (see FIG. 1) having increased display quality, and the stain compensating system and a stain compensating method having the increased reliability.

Figure 14:
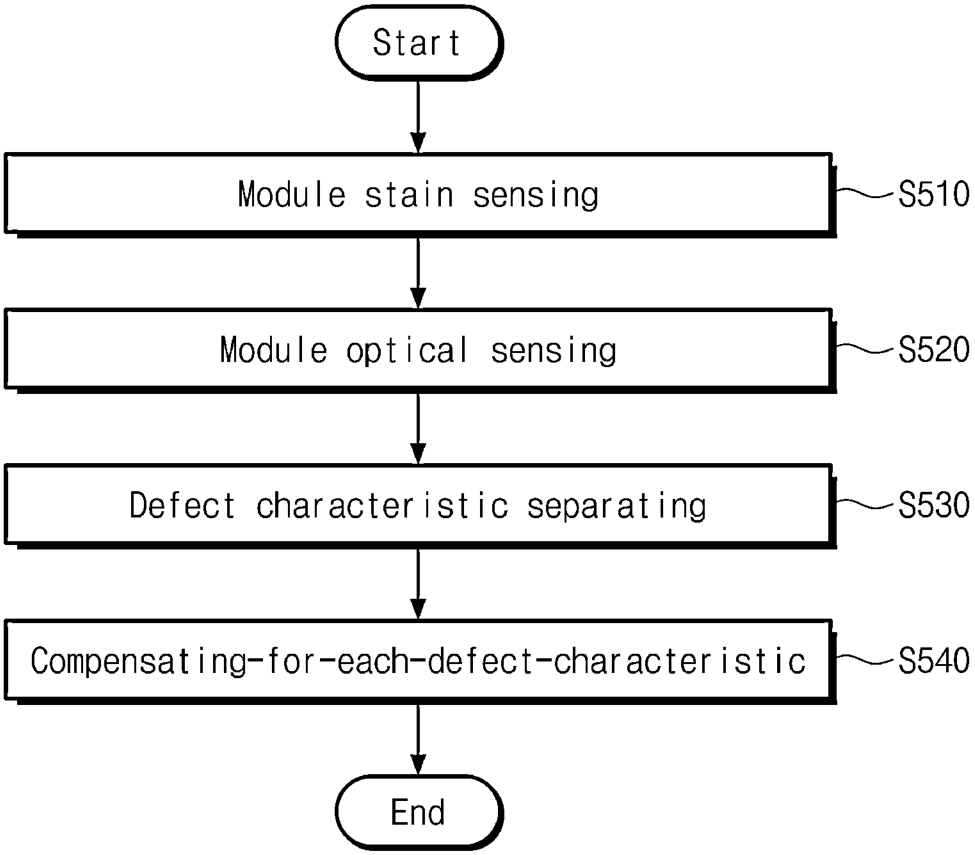
FIG. 14 is a flowchart illustrating a portion of a module process according to an embodiment of the present disclosure.

FIG. 14 is a flowchart illustrating a portion of a module process according to an embodiment of the present disclosure.

Referring to FIGS. 7 and 14, the module process S500 may include a module stain sensing step in block S510, a module optical sensing step in block S520, a defect characteristic extracting step in block S530, and a compensating-for-each-defect-characteristic step in block S540.

Figure 15:
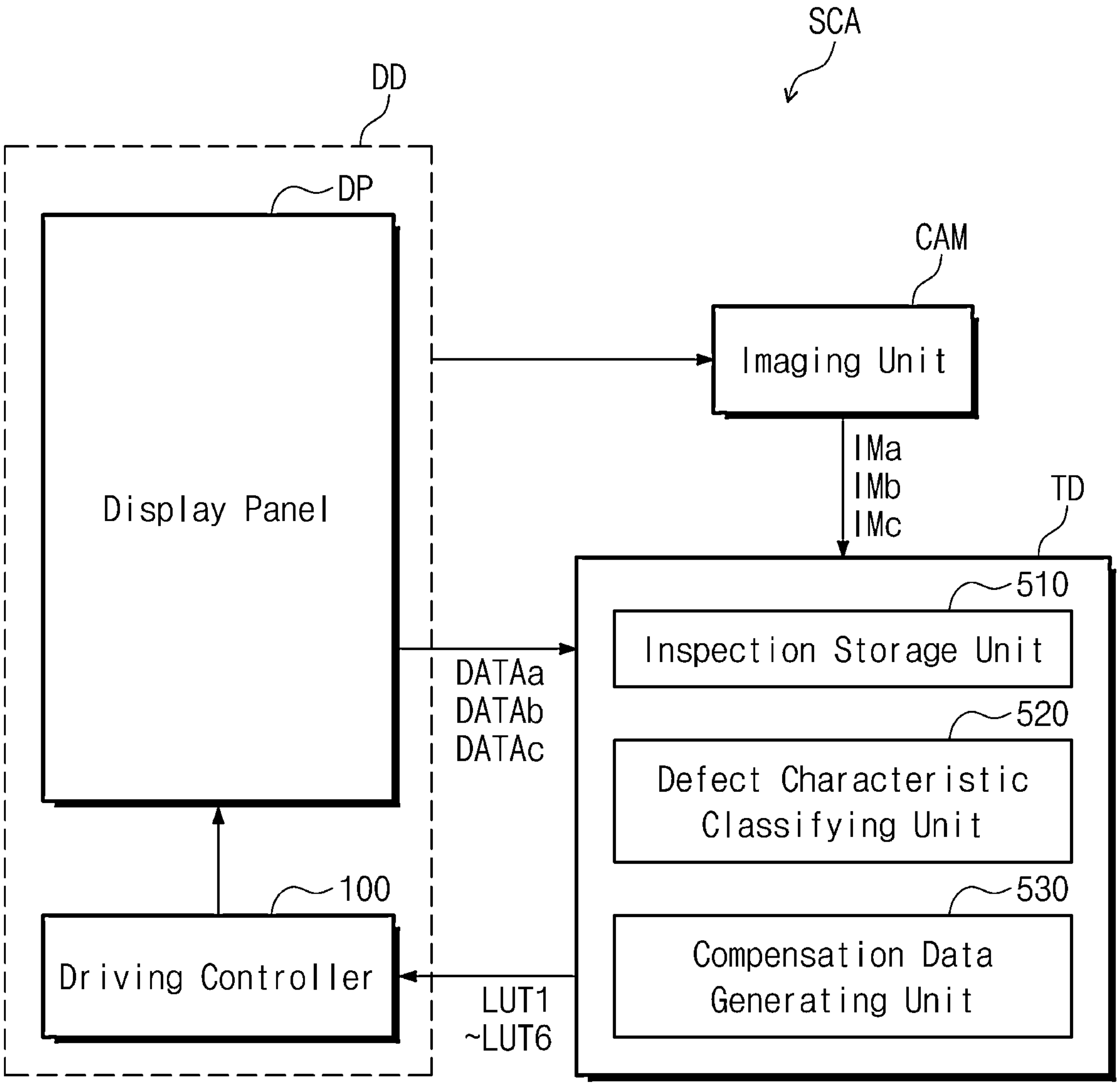
FIG. 15 illustrates a stain compensating system which performs a module stain sensing step, a module optical sensing step, a defect characteristic extracting step, and a compensating-for-each-defect-characteristic according to an embodiment of the present disclosure.

FIG. 15 illustrates the stain compensating system which performs the module stain sensing step, the module optical sensing step, the defect characteristic extracting step, and a compensating-for-each-defect-characteristic step according to an embodiment of the present disclosure.

Referring to FIGS. 9 and 15, the stain compensating system SCA may include the display device DD, the imaging unit CAM, and the inspection device TD provided in the module process S500.

The display device DD may include the display panel DP and the driving controller 100.

In an embodiment, the imaging unit CAM may generate image data IMa, IMb, and IMc by capturing images (IM, see FIG. 1) displayed by the display panel DP.

The inspection device TD may receive the image data IMa, IMb, and IMc. The inspection device TD may receive compensation data DATAa, DATAb, and DATAc from the display device DD. The inspection device TD may output the look-up tables LUT1 to LUT6 to the driving controller 100.

The inspection device TD may further include a compensation data generating unit 530.

In an embodiment, the defect characteristic classifying unit 520 may re-classify the plurality of pixels PX (see FIG. 3) into a first defect pixel, a second defect pixel, or a third defect pixel, based on the image data IMa, IMb, and IMc and the compensation data DATAa, DATAb, and DATAc. This will be described later.

The compensation data generating unit 530 may generate a plurality of compensated values based on the classified pixels PX (see FIG. 3) and generate the look-up tables LUT1 to LUT6 including the plurality of compensated values.

Figure 16A:
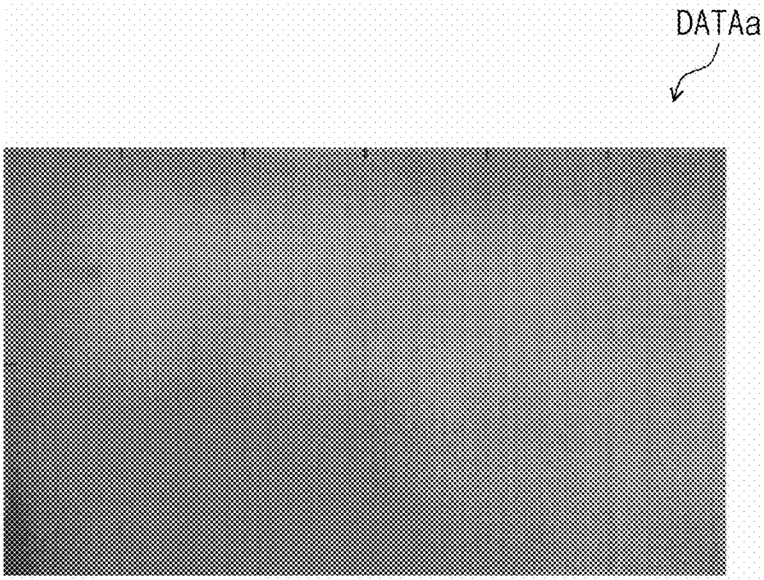
FIGS. 16A to 16C illustrate compensation data according to embodiments of the present disclosure.
Figure 16B:
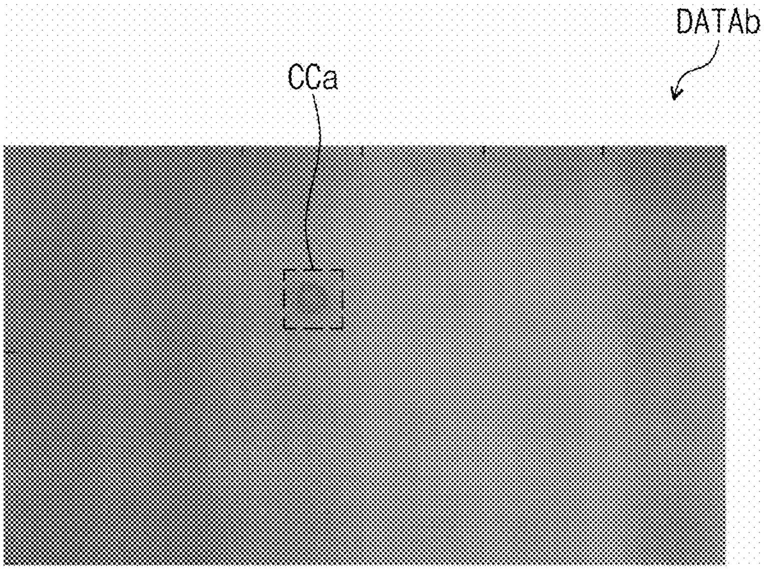
Figure 16C:
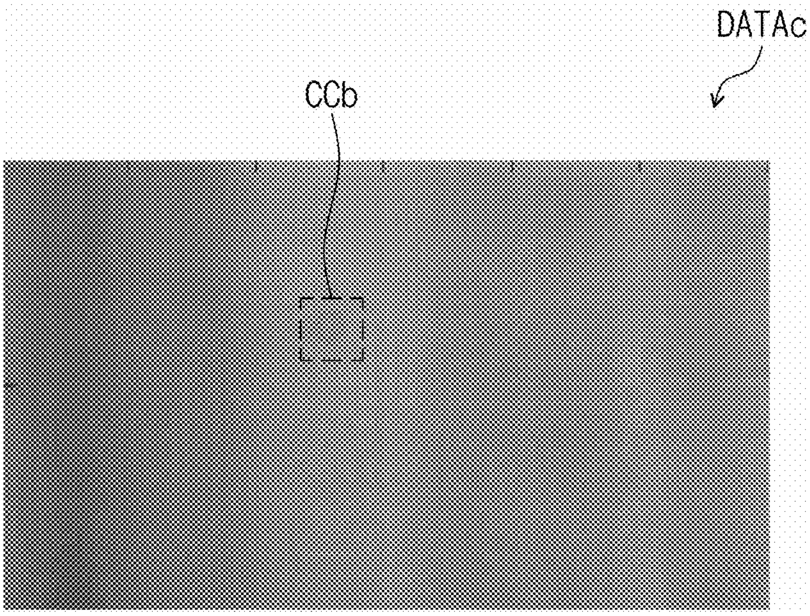

FIGS. 16A to 16C illustrate compensation data according to an embodiment of the present disclosure.

Referring to FIGS. 15 to 16C, in an embodiment the compensation data DATAa, DATAb, and DATAc may include the first compensation data DATAa, the second compensation data DATAb, and the third compensation data DATAc.

In an embodiment, the first compensation data DATAa may be data obtained by performing first compensation for the defect characteristic predicted based on the first measurement data DATA1 (see FIG. 9) and the second measurement data DATA2 (see FIG. 9), and then measuring a threshold voltage Vth of the driving transistor TR1 (see FIG. 5) of each of the plurality of pixels PX (see FIG. 3) to re-detect a defect characteristic.

In an embodiment, to measure the threshold voltage, the driving transistor TR1 (see FIG. 5) may be operated in a source follower manner, a first sensing voltage may be input to a source voltage of the driving transistor TR1 (see FIG. 5), and a change amount of the threshold voltage of the driving transistor TR1 (see FIG. 5) may be detected through the sensing line SL (see FIG. 5) based on the first sensing voltage. In this embodiment, a change amount of the threshold voltage of the driving transistor TR1 (see FIG. 5) may be determined depending on the strength of the first sensing voltage. However, embodiments of the present disclosure are not necessarily limited thereto, and a manner of measuring the first compensation data DATAa may be variously provided.

In an embodiment, the second compensation data DATAb may be data obtained by performing first compensation for the defect characteristic predicted based on the first measurement data DATA1 (see FIG. 9) and the second measurement data DATA2 (see FIG. 9), and then measuring the mobility of the driving transistor TR1 (see FIG. 5) of each of the plurality of pixels PX (see FIG. 3) to re-detect a defect characteristic.

In an embodiment, to measure the mobility of the driving transistor TR1, a voltage higher than the threshold voltage may be applied to the driving transistor TR1 (see FIG. 5) such that the driving transistor TR1 is turned on. In this state, the source voltage of the driving transistor TR1 (see FIG. 5) is input as a second sensing voltage, and the mobility of the driving transistor TR1 (see FIG. 5) may be detected through the sensing line SL (see FIG. 5). In this embodiment, a change amount of the mobility of the driving transistor TR1 (see FIG. 5) may be determined depending on the strength of the second sensing voltage. However, embodiments of the present disclosure are not necessarily limited thereto and a manner of measuring the second compensation data DATAb may variously be provided.

A first region CCa may be a region having a stain (e.g., a brightness difference stain) resulting from a brightness difference. The defect characteristic classifying unit 520 may re-detect pixels having brightness difference stains, which are caused due to the first defect, based on the second compensation data DATAb. The defect characteristic classifying unit 520 may re-classify the pixels as first defect pixels, thereby increasing reliability of the stain compensating method.

In an embodiment, the third compensation data DATAc may be data obtained by performing first compensation for the defect characteristic predicted based on the first measurement data DATA1 (see FIG. 9) and the second measurement data DATA2 (see FIG. 9), and then measuring the characteristic of the light emitting element ED (see FIG. 5) to re-detect a defect characteristic.

In an embodiment, to measure the characteristics of the light emitting element ED (see FIG. 5), when the driving transistor TR1 (see FIG. 5) produces a uniform output current, the intensity of light emitted from the light emitting element ED (see FIG. 5) may be measured. However, embodiments of the present disclosure are not necessarily limited thereto and a manner of measuring the third compensation data DATAc may variously be provided.

A second region CCb may be a region having a stain (e.g., a brightness difference stain) resulting from a brightness difference. The second region CCb may be a region corresponding to the first region CCa. The defect characteristic classifying unit 520 may re-detect pixels having brightness difference stains, which are caused due to the first defect, based on the third compensation data DATAc. The defect characteristic classifying unit 520 may re-classify the pixels as first defect pixels, thereby increasing reliability of the stain compensating method.

Figure 17A:
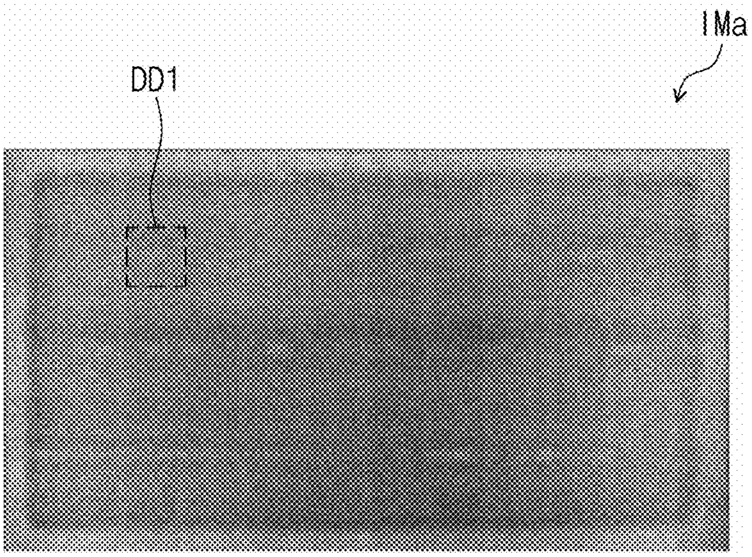
FIG. 17A is a view illustrating first image data according to an embodiment of the present disclosure
Figure 17B:
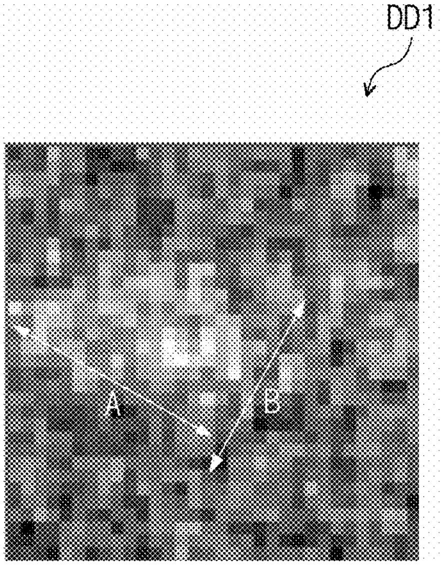
FIG. 17B is an enlarged view of a portion of first image data according to an embodiment of the present disclosure.

FIG. 17A is a view illustrating first image data according to an embodiment of the present disclosure, and FIG. 17B is an enlarged view of a portion of the first image data according to an embodiment of the present disclosure.

Referring to FIGS. 17A and 17B, in an embodiment the first image data IMa, such as a (2-1)-th image data, may be data obtained by photographing the display panel DP (see FIG. 15) displaying only the first light having the first color through the imaging unit CAM (see FIG. 15). In an embodiment, the first color may be a red color.

A first region DD1 may be a region having the fine monochrome stain. The fine monochrome stain may be caused by a defect of the second substrate S2 (see FIG. 6) including a light control pattern and a color filter. The fine monochrome stain may be a stain having a size less than an area of the 10×10 pixels. Fine monochrome stains may be caused in number corresponding to "A" number of pixels in the first pixel direction, and may be caused in number corresponding to "B" number of pixels in the second pixel direction crossing the first pixel direction. For example, in an instance, 'A' may be 10, and 'B' may be six.

Figure 18A:
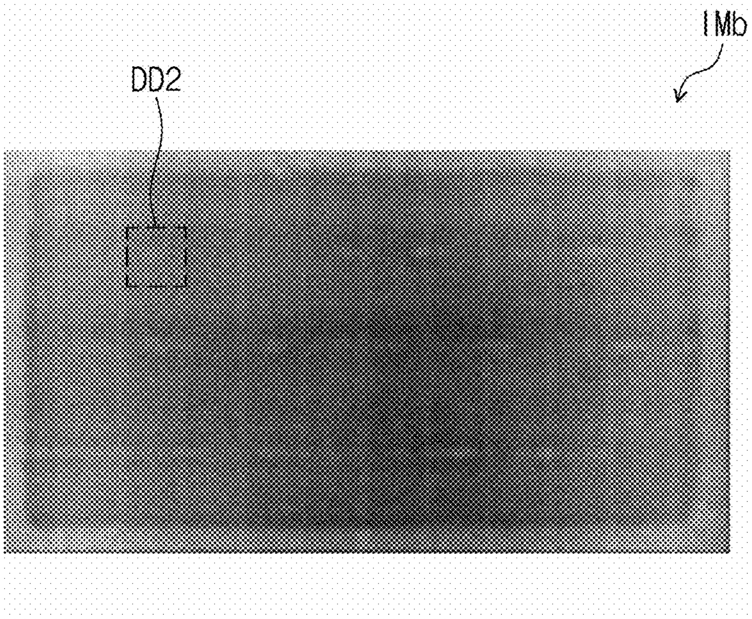
FIG. 18A illustrates second image data according to an embodiment of the present disclosure.
Figure 18B:
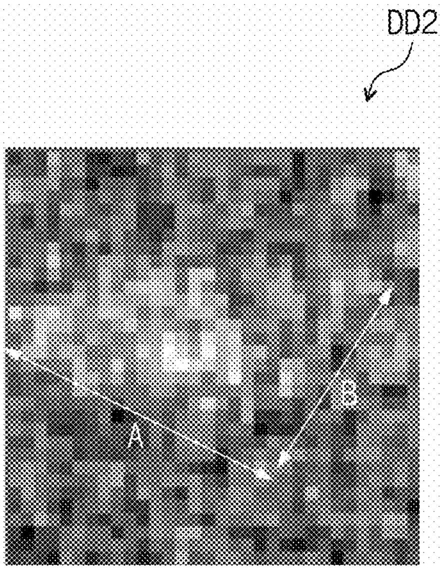
FIG. 18B is an enlarged view illustrating a portion of second image data according to an embodiment of the present disclosure.

FIG. 18A illustrates second image data according to an embodiment of the present disclosure, and FIG. 18B is an enlarged view illustrating a portion of second image data according to an embodiment of the present disclosure.

Referring to FIGS. 18A and 18B, in an embodiment the second image data IMb, such as a (2-2)-th image data, may be data obtained by photographing the display panel DP (see FIG. 15) displaying only the second light having the second color through the imaging unit CAM (see FIG. 15). In an embodiment, the second color may be a green color.

A second region DD2 may be a region having the fine monochrome stain. The fine monochrome stain may be caused due to the defect of the second substrate S2 (see FIG. 6) including the light control pattern and the color filter. The fine monochrome stain may be a stain having a size less than an area of the 10×10 pixels. The fine monochrome stains may be caused in number corresponding to "C" number of pixels in the third pixel direction, and may be caused in number corresponding to "D" number of pixels in the third pixel direction in the fourth pixel direction crossing the third pixel direction. For example, in an instance 'C' may be 12, and D may be eight.

Figure 19A:
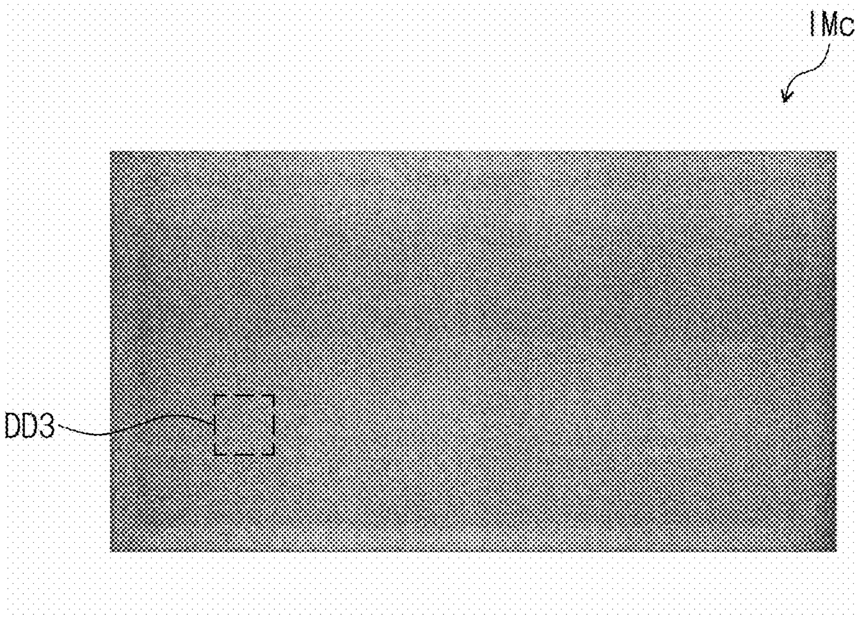
FIG. 19A illustrates third image data according to an embodiment of the present disclosure.
Figure 19B:
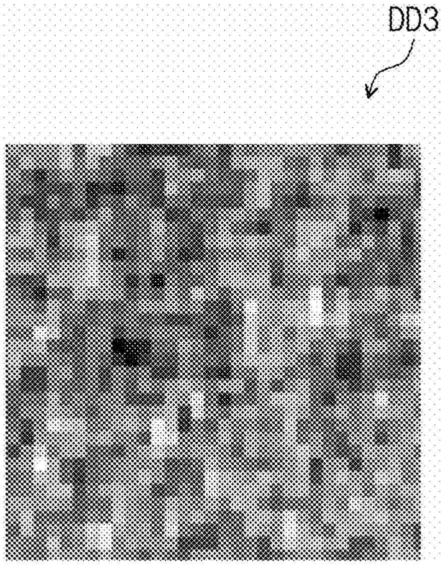
FIG. 19B is an enlarged view illustrating a portion of third image data according to an embodiment of the present disclosure.

FIG. 19A illustrates third image data according to an embodiment of the present disclosure, and FIG. 19B is an enlarged view illustrating a portion of third image data according to an embodiment of the present disclosure.

Referring to FIGS. 19A and 19B, in an embodiment the third image data IMc, such as a (2-3)-th image data, may be data obtained by photographing the display panel DP (see FIG. 15) displaying only the third light having the third color through the imaging unit CAM (see FIG. 15). In an embodiment, the third color may be a blue color.

The fine monochrome stain may be a stain recognized by brightness difference in a monochromatic pattern due to abnormal efficiency of light conversion by the absorption of the moisture and/or aeration. For example, the fine monochrome stain may not be caused in the third image data IMc obtained by photographing the second light control pattern WC2 not including quantum dots using blue light.

Referring to FIGS. 14 to 19B, the stain compensating system SCA may sense the compensation data DATAa, DATAb, and DATAc during the module stain sensing step in block S510. The stain compensating system SCA may sense the image data IMa, IMb, and IMc during the module optical sensing step in block S520.

The defect characteristic classifying unit 520 may re-classify the defect characteristics based on the defect characteristic, which are predicted based on the first measurement data DATA1 (see FIG. 9) and the second measurement data DATA2 (see FIG. 9) measured in the cell process in block S400 during the defect characteristic separating step in block S530, the compensation data DATAa, DATAb, and DATAc, and the image data IMa, IMb, and IMc.

In an embodiment, the defect characteristic classifying unit 520 may compare the compensation data DATAa, DATAb, and DATAc with the image data IMa, IMb, and IMc to re-detect the first defect or the second defect of the plurality of pixels PX (see FIG. 3). For example, the defect characteristic classifying unit 520 may re-classify pixels, which have a brightness difference stain caused due to the first defect, as first defect pixels based on the compensation data DATAa, DATAb, and DATAc and the image data IMa, IMb, and IMc, and re-classify pixels having the fine monochrome stain caused due to the second defect as the second defect pixels. The defect characteristic classifying unit 520 may additionally re-classify pixels having discoloration as third defect pixels.

For example, the defect characteristic classifying unit 520 may re-sort the first defect pixels out, based on the compensation data DATAa, DATAb, and DATAc, and re-sort the second defect pixels out by excluding the first defect pixels from the image data IMa, IMb, and IMc. The defect characteristic classifying unit 520 may re-sort the first defect pixels and the second defect pixels to increase reliability of the stain compensating method.

Referring to FIGS. 7 to 9, 14, and 15, the defect characteristic classifying unit 520 may linear drive the display panel DP in the linear drive inspection step in block S420 and first photograph the display panel DP using the imaging unit CAM. The defect characteristic classifying unit 520 may classify the first defect pixel and the second defect pixel based on the first measurement data DATA1 and the second measurement data DATA2.

The defect characteristic classifying unit 520 may capture the display panel DP using the imaging unit CAM in the module optical sensing in block S520. The defect characteristic classifying unit 520 may re-classify the second defect pixel based on the image data IMa, IMb, and IMc.

For example, the defect characteristic classifying unit 520 may classify the plurality of pixels PX (see FIG. 3) into the first defect pixel and the second defect pixel based on the first measurement data DATA1, the second measurement data DATA2, and the image data IMa, IMb, and IMc.

According to an embodiment of the present disclosure, the defect characteristic classifying unit 520 may extract the defect characteristic using the data measured in the cell driving testing in block S410 and the linear driving testing in block S420 in the cell process in block S400, re-extract the defect characteristic using the data measured through the module stain sensing step in block S510 and the module optical sensing step in block S520 in the module process in block S500, and combine the extracted defect characteristic with the re-extracted defect characteristic, thereby increasing the reliability of the classification of the defect characteristics.

The compensation data generating unit 530 may generate the first look-up table LUT1 including the first compensating value for compensating the brightness of the first defect pixel in first unit.

The compensation data generating unit 530 may generate the second look-up table LUT2 including the second compensating value for compensating the color of the second defect pixel in second unit. The second compensating value for compensating colors of a plurality of second defect pixels in second unit may be stored in the second look-up table LUT2.

The second look-up table LUT2 may store the second compensating value for compensating for a fine monochrome defect having the size less than the area of 10×10 pixels in the second unit.

The compensation data generating unit 530 may generate the third look-up table LUT3 including a third compensation value for compensating for the brightness of the first defect pixel in second unit.

The compensation data generating unit 530 may generate the fourth look-up table LUT4 including a fourth compensation value for compensating for the gray level of the third defect pixel in first unit.

The compensation data generating unit 530 may generate the fifth look-up table LUT5 including a fifth compensation value for compensating for the color of the second defect pixel in the first unit.

The compensation data generating unit 530 may generate the sixth look-up table LUT6 including a sixth compensation value for compensating for a gray level of the third defect pixels in second unit.

The compensation data generating unit 530 may provide the first look-up table LUT1 to the sixth look-up table LUT6 to the storage unit 120 (see FIG. 4) of the driving controller 100.

According to an embodiment of the present disclosure, the stain compensating system SCA may include the defect characteristic classifying unit 520 and the compensation data generating unit 530. The defect characteristic classifying unit 520 may specify defect pixels corresponding to each defect characteristic among the plurality of pixels PX (see FIG. 3), and the compensation data generating unit 530 may generate the first to sixth look-up tables LUT1 to LUT6 which optimize the compensation for the defect pixels and provide the first to sixth look-up tables LUT1 to LUT6 to the driving controller 100. The driving controller 100 may prevent stain defects from occurring in the image IM (see FIG. 1) displayed on the display panel DP by compensating for the defect pixels. Accordingly, there may provide the display device DD having the increased display quality, and the stain compensating system having the increased reliability, and the stain compensating method.

As described above, the stain compensating system may specify defect pixels, which are classified as having a defect corresponding to each of defect characteristics, of the plurality of pixels, with respect to the each defect characteristic, may create look-up tables for optimizing the compensation for the defect pixels, and may provide the look-up tables to the driving controller. The driving controller may compensate for defect pixels to prevent stain defect from occurring in the image displayed on the display panel. Accordingly, the display device having an increase in display quality may be provided, and the stain compensating system and the stain compensating method having increased reliability may be provided.

While the present disclosure has been described with reference to non-limiting embodiments thereof, it will be apparent to those of ordinary skill in the art that various changes and modifications may be made thereto without departing from the spirit and scope of the present disclosure.

What is claimed is:

1. A system for compensating a stain comprising:

a display device including a display panel including a plurality of pixels displaying an image and a driving controller driving the display panel;

an imaging unit capturing the image displayed by the display device; and an inspection device outputting a first compensating value and a second compensating value that is different from the first compensating value to the driving controller, the inspection device including a defect characteristic classifying unit and a compensation data generating unit, wherein the inspection device acquires a first measurement data and a second measurement data based on a first image data generated by the imaging unit, the first measurement data is data generated by measuring the display panel using a full contact array tester and the imaging unit in a state where the display panel is not connected to the driving controller, wherein the inspection device compares second image data generated by the imaging unit with compensation data that is based on the first measurement data and the second measurement data to determine the first and second compensating values, wherein the defect characteristic classifying unit classifies the plurality of pixels as a first defect pixel having a first defect or a second defect pixel having a second defect different from the first defect, based on the first measurement data, the second measurement data, and the second image data, and wherein the compensation data generating unit generates the first compensating value for compensating for the first defect pixel in a first pixel unit and the second compensating value for compensating for the second defect pixel in a second pixel unit different from the first pixel unit.

2. The system of claim 1, wherein the inspection device further includes:

an inspection storage unit storing the first measurement data and the second measurement data.

3. The system of claim 1, wherein the second pixel unit is smaller than the first pixel unit.

4. The system of claim 3, wherein:

the first pixel unit has a size equal to an area of 8×8 pixels; and the second pixel unit has a size equal to an area of 1×1 pixels.

5. The system of claim 1, wherein:

the first compensating value compensates for a brightness of the first defect pixel in the first pixel unit; and the second compensating value compensates for a color of the second defect pixel in the second pixel unit.

6. The system of claim 1, wherein the second image data includes:

a (2-1)-th image data generated by capturing the display panel that displays only a first light having a first color; and a (2-2)-th image data generated by capturing the display panel that displays only a second light having a second color different from the first color.

7. The system of claim 1, wherein each of the plurality of pixels includes a driving transistor and a light emitting element electrically connected to the driving transistor.

8. The system of claim 7, wherein the second measurement data is data generated by linear driving of the driving transistor in the display panel in a state where the display panel is not connected to the driving controller.

9. The system of claim 8, wherein:

the inspection device receives first compensation data, second compensation data, and third compensation data, after first compensating a defect characteristic predicted based on the first measurement data and the second measurement data from the display device, wherein the first compensation data is data generated by re-detecting the defect characteristic by measuring a threshold voltage of the driving transistor, wherein the second compensation data is data generated by re-detecting the defect characteristic by measuring mobility of the driving transistor, and wherein the third compensation data is data generated by re-detecting the defect characteristic by measuring a characteristic of the light emitting element.

10. The system of claim 1, wherein the compensation data generating unit additionally generates a third compensating value for compensating for brightness of the first defect pixel in the second unit.

11. The system of claim 10, wherein:

the defect characteristic classifying unit additionally classifies a third defect pixel that is different from each of the first defect pixel and the second defect pixel; and the compensation data generating unit additionally generates a fourth compensating value for compensating for grayscale of the third defect pixel in the first unit.

12. The system of claim 11, wherein the compensation data generating unit additionally generates a fifth compensating value for compensating for color of the second defect pixel in the first unit.

13. The system of claim 12, wherein the compensation data generating unit additionally generates a sixth compensating value for compensating for grayscale of the third defect pixel in the second unit.

14. A method for compensating for a stain, the method comprising:

measuring a first measurement data for a display panel included in a display device having a driving controller using a full contact array tester and an imaging unit in a state where the display panel is not connected to the driving controller, the display panel having plurality of pixels;

measuring a second measurement data by linear driving of the display panel;

classifying the plurality of pixels as a first defect pixel having a first defect or a second defect pixel having a second defect different from the first defect, based on the first measurement data and the second measurement data;

extracting image data by capturing an image displayed by the display device, by the imaging unit;

re-classifying the first defect pixel and the second defect pixel based on the extracted image data; and generating a first compensating value for compensating for the first defect pixel in a first pixel unit and a second compensating value for compensating for the second defect pixel in a second pixel unit that is different from the first pixel unit.

15. The method of claim 14, wherein the extracting of the image data includes:

extracting a first image data generated by capturing the display panel that displays only a first light having a first color; and extracting a second image data generated by capturing the display panel that displays only a second light having a second color different from the first color.

16. The method of claim 15, wherein:

each of the plurality of pixels includes a driving transistor and a light emitting element electrically connected to the driving transistor, and wherein the method further includes:

receiving a compensation data measured from the driving transistor and the light emitting element.

17. The method of claim 16, wherein the display panel further includes;

a light control pattern and a color filter disposed on the light emitting element, and wherein the classifying into the first defect pixel or the second defect pixel includes:

classifying a defect made by the driving transistor and the light emitting element as the first defect based on the first measurement data and the compensation data; and classifying a defect resulting from the light control pattern and the color filter as the second defect based on the second measurement data and the image data.

18. The method of claim 17, wherein the re-classifying of the first defect pixel and the second defect pixel includes:

receiving a first compensation data generated by re-detecting a defect characteristic by measuring a threshold voltage of the driving transistor;

receiving a second compensation data generated by re-detecting the defect characteristic by measuring mobility of the driving transistor; and receiving a third compensation data generated by re-detecting the defect characteristic by measuring a characteristic of the light emitting element.

19. The method of claim 14, wherein:

the first pixel unit has a size equal to an area of 8×8 pixels; and the second pixel unit has a size equal to an area of 1×1 pixels.

* * * * *